US012217729B2

(12) United States Patent
Strachan

(10) Patent No.: US 12,217,729 B2
(45) Date of Patent: Feb. 4, 2025

(54) MUSIC SHAPER

(71) Applicant: Mark Strachan, Thousand Oaks, CA (US)

(72) Inventor: Mark Strachan, Thousand Oaks, CA (US)

( * ) Notice: Subject to any disclaimer, the term of this patent is extended or adjusted under 35 U.S.C. 154(b) by 0 days.

(21) Appl. No.: 18/236,304

(22) Filed: Aug. 21, 2023

(65) Prior Publication Data

US 2023/0395050 A1 Dec. 7, 2023

Related U.S. Application Data

(63) Continuation of application No. 17/195,839, filed on Mar. 9, 2021, now Pat. No. 11,790,874, which is a continuation of application No. 16/669,960, filed on Oct. 31, 2019, now Pat. No. 10,957,292, which is a continuation of application No. 16/294,785, filed on Mar. 6, 2019, now Pat. No. 10,468,000, which is a continuation of application No. 15/694,819, filed on Sep. 3, 2017, now Pat. No. 10,235,983, which is a continuation of application No. 15/374,899, filed on Dec. 9, 2016, now Pat. No. 9,754,570, which is a continuation of application No. 14/986,691, filed on Jan. 3, 2016, now Pat. No. 9,530,391.

(60) Provisional application No. 62/101,982, filed on Jan. 9, 2015.

(51) Int. Cl.

| | |
|---|---|
| ***G10H 1/00*** | (2006.01) |
| ***G10G 1/00*** | (2006.01) |
| ***G10G 1/02*** | (2006.01) |
| ***G10H 1/38*** | (2006.01) |

(52) U.S. Cl.
CPC ............. *G10H 1/0025* (2013.01); *G10G 1/00* (2013.01); *G10G 1/02* (2013.01); *G10H 1/38* (2013.01); *G10H 2210/071* (2013.01); *G10H 2210/105* (2013.01); *G10H 2210/125* (2013.01); *G10H 2210/571* (2013.01); *G10H 2220/106* (2013.01); *G10H 2220/126* (2013.01); *G10H 2220/131* (2013.01); *G10H 2240/125* (2013.01)

(58) Field of Classification Search
CPC .. G10H 1/0025; G10H 1/38; G10H 2210/071; G10H 2210/105; G10H 2210/125; G10H 2210/571; G10H 2220/106; G10H 2220/126; G10H 2220/131; G10H 2240/125; G10G 1/00; G10G 1/02
See application file for complete search history.

(56) References Cited

U.S. PATENT DOCUMENTS

| | | | | | |
|---|---|---|---|---|---|
| 5,370,539 | A * | 12/1994 | Dillard | G09B 15/003 434/405 |
| 5,415,071 | A * | 5/1995 | Davies | G10H 1/344 84/485 SR |
| 5,741,990 | A * | 4/1998 | Davies | G09B 15/004 84/424 |
| 6,031,172 | A * | 2/2000 | Papadopoulos | G09B 1/20 84/474 |

(Continued)

*Primary Examiner* — Jeffrey Donels
(74) *Attorney, Agent, or Firm* — Paul D. Chancellor; Ocean Law

(57) ABSTRACT

A music composition, editing, and playback system and method provides a user interface design based on geometric interpretation of music theory replacing traditional modern music notation with geometric shapes including chords represented by polygons that are colored with colors or hues.

6 Claims, 24 Drawing Sheets

(56) References Cited

U.S. PATENT DOCUMENTS

| | | | | |
|---|---|---|---|---|
| 6,201,769 | B1 * | 3/2001 | Lewis | G09B 15/00 84/484 |
| 6,245,981 | B1 * | 6/2001 | Smith | G09B 15/005 84/474 |
| 6,320,112 | B1 | 11/2001 | Lotze | |
| 6,353,170 | B1 | 3/2002 | Eyzaguirre et al. | |
| 6,392,131 | B2 * | 5/2002 | Boyer | G10D 13/09 84/424 |
| 6,448,487 | B1 * | 9/2002 | Smith | G10H 1/20 84/613 |
| 6,570,584 | B1 | 5/2003 | Cok et al. | |
| 6,930,235 | B2 * | 8/2005 | Sandborn | G09B 15/02 84/464 R |
| 7,519,603 | B2 | 4/2009 | Parker | |
| 2002/0176591 | A1 * | 11/2002 | Sandborn | G09B 15/02 84/464 R |
| 2004/0148575 | A1 * | 7/2004 | Haase | G10H 1/0008 715/201 |
| 2005/0241465 | A1 * | 11/2005 | Goto | G06F 16/438 84/616 |
| 2006/0285136 | A1 | 12/2006 | Shin et al. | |
| 2008/0022842 | A1 * | 1/2008 | Lemons | G09B 15/009 84/483.2 |
| 2008/0055479 | A1 | 3/2008 | Shehata et al. | |
| 2008/0245212 | A1 * | 10/2008 | Lemons | G09B 15/02 84/483.2 |
| 2008/0264240 | A1 * | 10/2008 | Lemons | G10H 1/0025 84/483.2 |
| 2008/0264241 | A1 * | 10/2008 | Lemons | G10L 21/06 84/645 |
| 2008/0271591 | A1 * | 11/2008 | Lemons | G09B 15/023 84/645 |
| 2008/0276791 | A1 * | 11/2008 | Lemons | G10H 1/383 84/483.2 |
| 2009/0223348 | A1 * | 9/2009 | Lemons | G10H 1/0008 84/483.2 |
| 2009/0249941 | A1 * | 10/2009 | Lemons | G09B 15/02 84/483.2 |
| 2009/0272251 | A1 * | 11/2009 | Georges | H04M 19/04 84/609 |
| 2011/0061108 | A1 * | 3/2011 | Arrasvuori | G06F 21/10 709/219 |
| 2011/0161409 | A1 * | 6/2011 | Nair | G06F 8/38 709/205 |
| 2014/0052281 | A1 * | 2/2014 | Eronen | G06F 3/165 700/94 |
| 2014/0122983 | A1 * | 5/2014 | Shyamsundar | G06Q 10/10 715/202 |
| 2015/0039620 | A1 * | 2/2015 | Ning | G06F 16/4387 707/740 |

* cited by examiner

500B

| Position | Hue |
|---|---|
| 5(right) | G2 |
| 4(right) | B |
| 3(right) | P |
| 2(right) | O |
| 1(right) | G1 |
| 0 | F |
| 1(left) | G1 |
| 2(left) | O |
| 3(left) | P |
| 4(left) | B |
| 5(left) | G2 |

| Position | Hue |
|---|---|
| 5(right) | B |
| 4(right) | G2 |
| 3(right) | O |
| 2(right) | P |
| 1(right) | G1 |
| 0 | F |
| 1(left) | G1 |
| 2(left) | O |
| 3(left) | P |
| 4(left) | B |
| (left) | G2 |

Asymmetric Right

| Position | Hue |
|---|---|
| 5(right) | G2 |
| 4(right) | B |
| 3(right) | P |
| 2(right) | O |
| 1(right) | G1 |
| 0 | F |
| 1(left) | G1 |
| 2(left) | O |
| 3(left) | P |
| 4(left) | B |
| 5(left) | G2 |

Symmetric

| Position | Hue |
|---|---|
| 5(right) | G2 |
| 4(right) | B |
| 3(right) | P |
| 2(right) | O |
| 1(right) | G1 |
| 0 | F |
| 1(left) | G1 |
| 2(left) | P |
| 3(left) | O |
| 4(left) | G2 |
| 5(left) | B |

MUSIC SHAPER

PRIORITY AND INCORPORATION BY REFERENCE

This patent application is a continuation of U.S. patent application Ser. No. 17/195,839 filed Mar. 9, 2021 which is a continuation of U.S. patent application Ser. No. 16/669,960 filed Oct. 31, 2019 now U.S. Pat. No. 10,957,292 which is a continuation of U.S. patent application Ser. No. 16/294,785 filed Mar. 6, 2019 now U.S. Pat. No. 10,468,000, which is a continuation of U.S. patent application Ser. No. 15/694,819 filed Sep. 3, 2017 now U.S. Pat. No. 10,235,983, which is a continuation of U.S. patent application Ser. No. 15/374,899 filed Jan. 3, 2016 now U.S. Pat. No. 9,754,570 which is a continuation of U.S. patent application Ser. No. 14/986,691 filed Dec. 6, 2016 now U.S. Pat. No. 9,530,391 and claims the benefit of U.S. Provisional Patent Application No. 62/101,982 filed Jan. 9, 2015 which are incorporated herein in their entireties and for all purposes. This application incorporates by reference, in their entireties and for all purposes, U.S. Pat. No. 6,570,584 filed May 15, 2000, U.S. Pat. No. 7,519,603 filed Nov. 27, 2002, U.S. Pat. No. 6,320,112 filed May 18, 2001, U.S. Pat. No. 6,353,170 filed Sep. 3, 1999 and U.S. Patent Application Nos. 20080055479 A1 filed Sep. 4, 2007 and 20060285136 filed Mar. 13, 2006.

BACKGROUND OF THE INVENTION

The tasks of composing and editing musical compositions have long been tedious work characterized by use of modern staff notation. Generations of composers and musicians have learned this method of composing, memorializing, and/or playing various works. However, many fail to attempt or master the rigors of reading and writing in modern staff notation. For example, The Beatles, Jimi Hendrix, and Eric Clapton became famous, although they were arguably "illiterate" musicians because they could not read music. The music of many less famous musicians has likely been lost for lack of the ability to record it in traditional modern staff notation. A solution to this problem is to replace modern staff notation with a more accessible technique for composing and memorializing musical works.

FIELD OF INVENTION

This invention relates to machines, articles of manufacture, and processes. In particular, a computer based aid for composing, editing, and playing music is provided.

DISCUSSION OF THE RELATED ART

The scholar and music theorist Isidore of Seville, writing in the early 7th century, considered that "unless sounds are held by the memory of man, they perish, because they cannot be written down." Since music's Classical period, from about 1750 to 1820, music notation including a multi-line or five-line staff has been known and adapted in what has been called a system of "modern" music notation. Known and used by Chopin and Taylor Swift alike, the term "modern" appears misplaced as there has been only little improvement during the last two centuries. In particular, this ancient system of music notation has been an impediment to both those who would compose new music and those learning to play music presented in this format.

SUMMARY OF THE INVENTION

Embodiments of the present invention provide one or more aids for composing, editing and playing musical works.

In an embodiment, a music composition, editing, and playback system comprises: a processor and one or more input/output devices including a display or displays which may include a touch sensitive display screen; the processor for executing a computer readable code for music composition, editing, and playback; musical notes and chords are visualized in one or more note circles, each note circle including an octave of notes; each chord visualization derived from one or more of seven base vector triads, has a particular polygonal shape colored with a particular hue, differs from visualizations of other chords for at least one of a different shape or a different hue, and includes an indication of the chord root note; visualizations of musical rhythms created by aggregation of plural ones of the visualized notes and chords in a time circle; time circle circumference equal to a particular musical distance and a time marker for moving around the circle; and, the aggregation of notes and chords visualized in the time circle in accordance with a user selected rate or scale of the time marker.

Embodiments of the invention provide a computing, internet, and/or cloud based platform for musical expression, collaboration, creativity & content sharing, with a user interface design based on a geometric interpretation of music theory.

In an embodiment, the user interface design for music shaper translates western music theory into a notation of shape and color, allowing the user to easily and intuitively express themselves through touch interactions.

In an embodiment, the invention is an enabler for writing music without detailed knowledge of music notation. This enabler avoids the music notation of the present centuries old system which delays learning by, among other things, obfuscating the mathematical structures present in music. This representation removes obfuscations, and enables user interfaces for intuitive operation.

Music Shaper can benefit society because it will help more people experience and write music in a new and fun way. It will share concepts from upper division and graduate mathematics, graphically, with the general public. By helping people through the learning curve for music writing, it opens up commercial potential for new economic interactions allowing users to sell each other content they create.

Music Shaper can impact society by helping transform the internet from a market of advertisers to a more desirable market of content producers, and simultaneously advance the state of the art in distributed computing.

Goals of the Music Shaper include one or more of constructing a software system that allows untrained musicians, to compose and play complete works of music, using intuitive 2D and 3D visual, touch, and gesture based interfaces. These interfaces are designed using a geometric and higher dimensional interpretation of the syntax and semantics of music theory. Embodiments enable the user to sculpt music out of geometric shapes with their fingertips, the product being a work that is consistent with the rules of Western music theory, but not unnecessarily limited in content, structure, or genre.

In an embodiment the invention provides a method of representing a complete chord catalog, the method comprising the steps of: constructing a parameterized curve encircling an axis multiple times; representing "n" musical octaves with the curve such that for any integral number of octaves the curve origin and end lie in the same plane as the axis; positioning notes on the curve to form a 12 tone equal temperament tuning system for each octave; taking 3 notes at a time selecting the 7 largest triangles that interconnect 3 notes wherein each newly selected triangle is neither of an inversion of or a rotationally symmetric copy of any one of the previously selected triangles [and] wherein each of the selected triangles represents a musical chord; and, from the 7 chords, selecting a set of chords that forms a four layer decision tree; wherein each chord in the set of chords is a composite (more than 3 notes) of 2 to 4 of the 7 chords, the set of chords includes every unique composite chord, and in three adjacent layers successive chords are selected such that the latter chord shares a vertex with the prior chord.

In another embodiment the invention provides a method of creating colorations for three note chords, the method comprising the steps of: selecting a first set of CIECAM02 environmental parameters including adaptation, surrounding lighting, background luminance, and white point; after the environmental parameters are selected, selecting a second set of CIECAM02 parameters including lightness and chroma; displaying a CIECAM02 hue wheel parameterized by lightness and chroma; in a default interval color selection, locating six substantially equally spaced roundels on the hue wheel, each roundel identifying a different interval color; providing a roundel or hue wheel adjustor enabling a user to relocate the roundels on the hue wheel for adjusting interval colors; selecting sets of interval colors for mixing to produce chord coloration for symmetric chord pairs, asymmetric chords, and corresponding colors for chord inversions; verifying that the chord colors when mapped from a CIELUV color space to a CIECAM02 color space are in gamut; for "n" octaves defining (n×12) notes, setting a first lightness for the lowest frequency note and a second lightness for the highest frequency note, the intermediate notes being spaced by equal frequency increments; for each represented note, determining a chroma value that assures the note is displayable for all hues; varying hue to represent different inversions of a chord; varying lightness to indicate note frequency; and, from the collection of three note chords inherent in the "n" octaves, selecting and displaying an image of the chord that is colored in accordance with the above steps.

BRIEF DESCRIPTION OF THE DRAWINGS

The present invention is described with reference to the accompanying figures. These figures, incorporated herein and forming part of the specification, illustrate embodiments of the present invention and, together with the description, further serve to explain the principles of the invention and to enable a person skilled in the relevant art to make and use the invention.

DETAILED DESCRIPTION OF THE PREFERRED EMBODIMENTS

The disclosure provided in the following pages, including Attachment I, describes examples of some embodiments of the invention. The designs, figures, and descriptions are non-limiting examples of certain embodiments of the invention. For example, other embodiments of the disclosed device may or may not include the features described herein. Moreover, disclosed advantages and benefits may apply to only certain embodiments of the invention and should not be used to limit the disclosed inventions.

Figure 1:
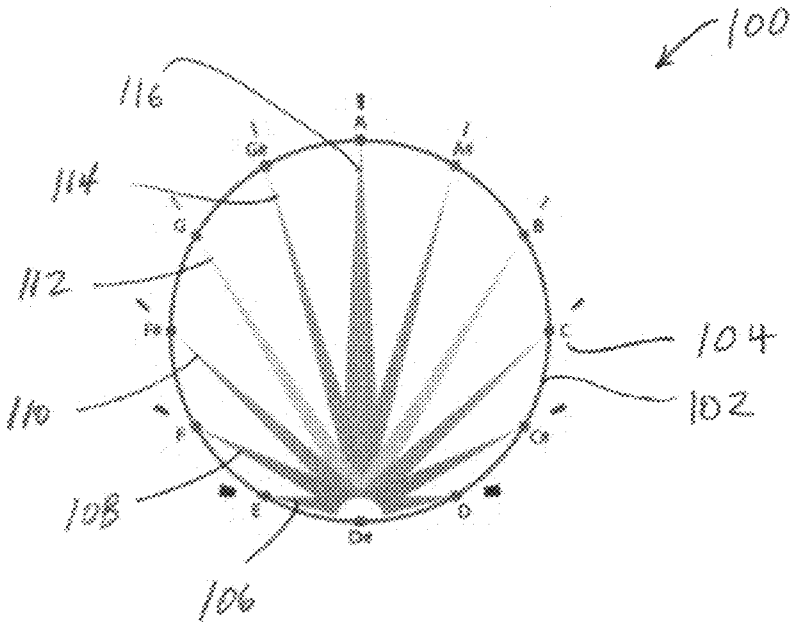
FIG. 1 shows a drawing of an interval lotus of the present invention.

FIG. 1 shows an interval lotus 100. Arranged with a circle 102, the lotus shows twelve notes (see e.g., 104 note C) of an octave evenly spaced around the circle. Inside the circle are reaches of the lotus along paths between a root note, here D#, and each of the other notes around the circle.

The reaches appear as plumes with varying different hues. As seen, the plumes to either side of a central plume from D# to A (116) colored in pinkish purple appear as mirror images in both form and hue. As shown, the D# to E (106), D is colored in olive green, D# to F (108), C# is colored in blue, D# to F#(110), C is colored in blue purple, D# to G (112), B is colored in orange, D# to G#(114), A# is colored in lime green. These colors may be referred to herein in accordance with the hue table below.

Hue Table

| Hue | Designation |
|---|---|
| Dark green or olive green | G1 |
| Blue | B |
| Purple or blue purple | P |
| Orange | O |
| Light green or lime green | G2 |
| Pinkish purple | F |

The interval lotus may be used in connection with formulating and/or describing, among other things, musical notes, diads, and triads. For example, the interval lotus aids selection of key and chords using a circular context.

Figure 2:
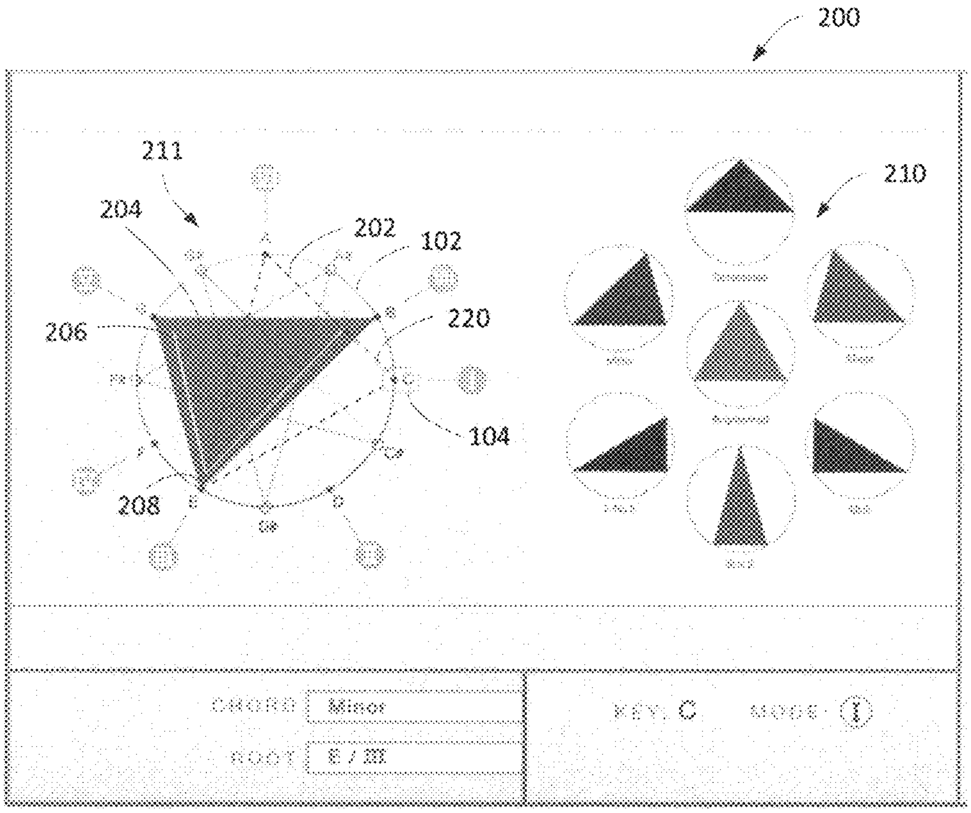
FIG. 2 shows a drawing of chord construction of the present invention.

FIG. 2 shows how a particular musical chord, a three note triad, is fitted into a note circle 200. At right in the figure 210 are four basic triads, major, minor, diminished, augmented and three additional triads 7 No 5, Mb5, and Sus 2. The triads characterize chord quality and are represented by polygons of different colors or hues. Further, the major and minor chords are structural mirror images as are the 7 No 5 and Mb5 chords. Any one of these triads may be fitted into the interval lotus space and aligned to provide a particular root note. At left in the figure 211, a minor chord 204 is shown fitted into the interval lotus space. A delta or chevron 206 imposed on the chord points to E, the chord root note 208. As seen, different or additional triad chords 202, 204 may also be fitted into the interval lotus space.

Figure 3:
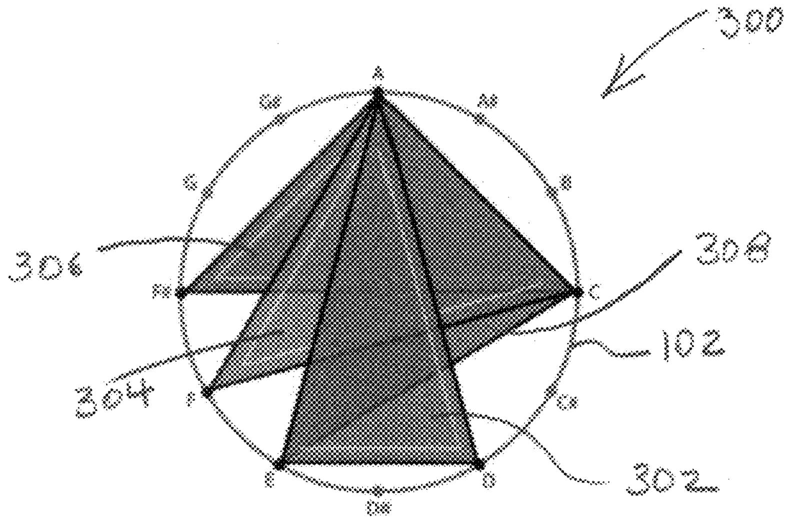
FIG. 3 shows a drawing of multiple triad chords within a note circle of the present invention.

FIG. 3 shows a four triad chords in a note circle 300. As shown, a Sus 2 triad 302 has root note D, a major triad 304 has a root noted F, a diminished chord 306 has a root note F#, and a fourth triad 308 has a root note A.

Figure 4:
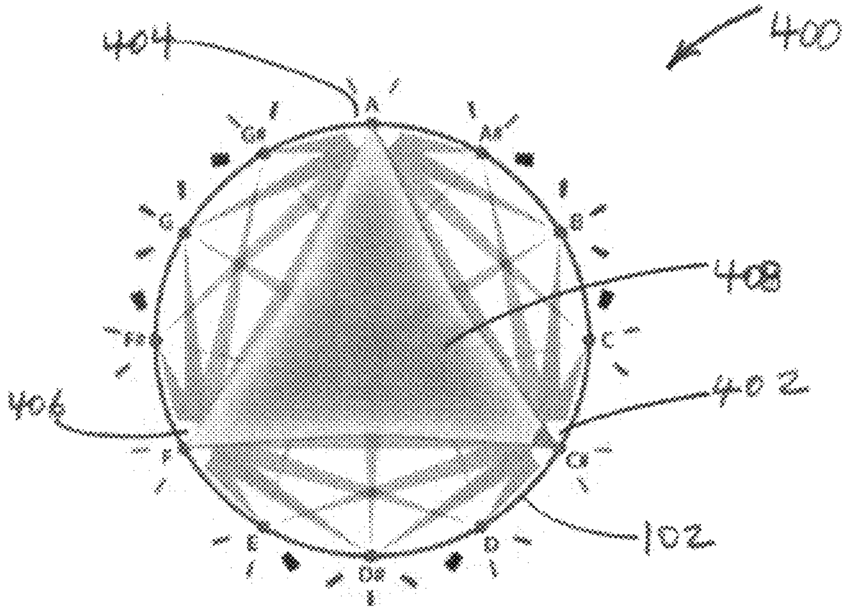
FIG. 4 shows a drawing of a triad chord and lotus reaches emanating from triad vertices of the present invention.

FIG. 4 shows a single triad chord in an interval lotus including lotus reaches emanating from chord vertices 400. In particular, the chord shown is an augmented chord 408 with vertices 402, 404, 406 at respective notes C#, A, and F. Starbursts at the chord vertices are discussed below.

Chords may be derived from seven (7) base vector triads and may be represented by selected corresponding colors and shapes such as polygons and these may be used to construct individual chords. Alternately a library of chords or keys and chords may be navigated by decision tree, by geometric configuration, and also by chord name. Intervals are represented by the coloration of a lotus, and the interaction of the lotus can be used to show individual interval influences for note choices and the structure of chord support for a given configuration of notes. Embodiments of the present invention enable visualization of these choices. These choices can be visualized in real time for played notes such as midi notes. A library of keys can also be implemented by chord choice in tree format. As is further explained below, embodiments of the present invention may provide a chord navigator allowing for rotation and basic transformations of key objects, along with root/mode setting, and quick play of modes for musical feeling ear training.

In an embodiment, a chord selection application allows the user to see the geometric configuration of keys 220 in the note circle, test out notes, and apply composite chords to the note circle 102. Here, the user may rotate key, set accidental, set mode, apply multiple chords and rotate them through constrained locations. In various embodiments, the twelve (12) notes on the circle are active midi note send regions. Notes not in the key will be prevented from playing, as will notes outside a chord if a chord is selected. The application displays the seven (7) basic triads from which all other notes may be selected. The interface will display the selected key and mode, and will also display the current selected chord components and its root note. In some embodiments the chords will show a delta on the triangle, to indicate their root position, and the system will indicate which mode has been selected by highlighting it. The system may also highlight a point of the key if it has been set with an accidental and the system may allow chords to be locked and unlocked, and also cleared.

The above provides an introduction to methods of visualization of various musical elements as disclosed herein. These and other methods useful in tasks including composing, editing, and playing musical works are explained in some detail below.

FIGS. 5A-12B illustrate means for visualizing and/or displaying musical notes, intervals, triad chords, and composite chords.

Embodiments of the present invention may utilize one or more display architectures to characterize elements of a musical work. Features of a display architecture may include two and/or three dimensional geometric figures and collections of such geometric figures. Additional information about the musical element may be added by marking geometric figures as through the selection of hue, chroma, and lightness values.

Geometric figures include loti, starbursts, intervals, diads, triads, and groups of one or more of these figures. And, as explained below, loti may be used as building blocks to construct a starburst. From two intersecting starbursts an interval between notes may be determined. Three intervals may be used to determine a triad musical chord and multiple triad chords may be used to determine a composite chord.

Figures 5A, 5B:
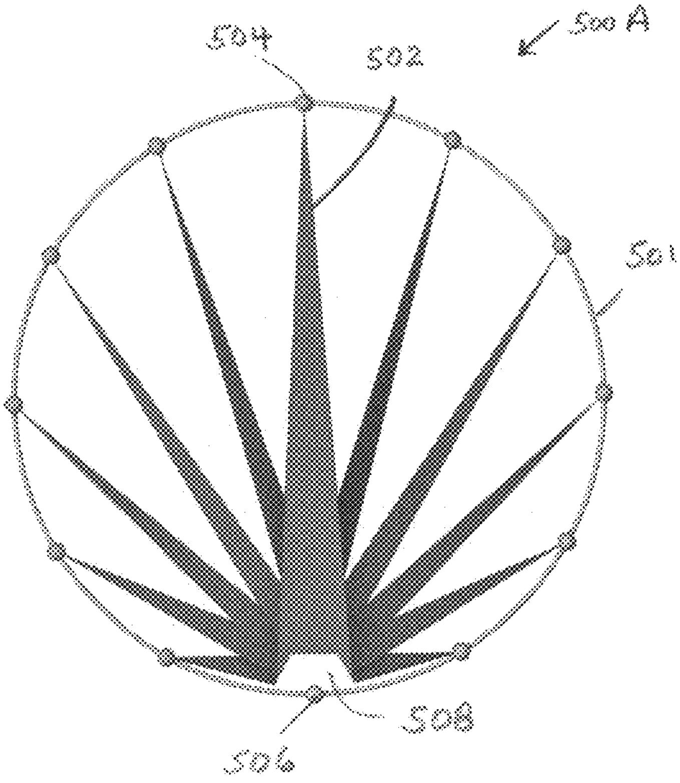
FIGS. 5A-B show a symmetric lotus and corresponding plume tabulation of the present invention.

Turning now to the construction of starbursts from loti, FIG. 5A shows a symmetric lotus 500A indicative of an exemplary octave in a 12 tone equal temperament tuning system. The notes of the octave are indicated by evenly spaced marks 504 located along a lotus circle or octave path 501. Lotus intervals are indicated by plumes that lie along lines between a lotus root note 506 and another note of the octave 504. Notably, the plumes may emanate from, but avoid contact 508 with either or both of the root note and the notes to which they lead. For example, a maximum lotus interval may be indicated by a plume 502 centrally located in the lotus and lying along a line between a root note 506 and a note opposite the root note 504. Given there are 12 notes in the octave, five intervals lie to the left of the central interval and five intervals lie to the right of the central interval.

FIG. 5B shows a tabular description of lotus plumes 500B. At the center of the table is a central or zero plume with a hue "F" which may be equated with pinkish purple or fuchsia. To the right and left of center are first plumes 1(right) and 1(left) with hues "G1" that may be equated with a dark green. To the right and left of the first plumes are second plumes 2(right) and 2(left) with hues "0" that may be equated with orange. To the right and left of the second plumes are third plumes 3(right) and 3(left) with hues "P" that may be equated with purple. To the right and left of the third plumes are fourth plumes 4(right) and 4(left) with hues "B" that may be equated with blue. To the right and left of the second plumes are fifth plumes 5(right) and 5(left) with hues "G2" that may be equated with a light green.

The lotus of FIG. 5A is termed a "symmetric lotus" because the plume hues are symmetric about the central plume such that corresponding plume pairs 1(righ0:1(left), 2(righ0:2(left), 3(righ0:3(left), 4(right):−4(left), and 5(righ0:5(left) have the same hue. In the case of a right asymmetric loti (see e.g., FIG. 6D), the 2nd and 3rd plume hues on the right are reversed and the 4th and 5th plume hues on the right are reversed. In the case of a left asymmetric loti (see e.g., FIG. 6F), the 2nd and 3rd plume hues on the left are reversed and the 4th and 5th plume hues on the left are reversed.

Whether a lotus is symmetric or asymmetric, it may be described as having a lotus root or base note and a corresponding root or maximum interval between notes such that the lotus includes a first or lower range of five intervals to one side of the maximum interval and a second or higher range of five intervals to the other side of the maximum interval.

It should be noted that while a lotus may be used to describe intervals in a single octave as seen above, intervals may also extend between a root note and a note in the same or a different octave as is further explained in connection with harmony spirals below.

FIGS. 6A-F show illustrate features of an exemplary starburst harmony spiral 600A-F.

Figure 6B:
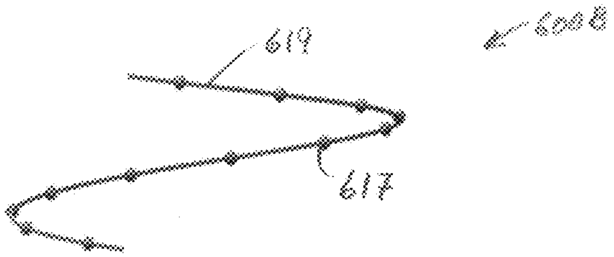
FIGS. 6A-F and FIG. 7 show construction of a starburst of the present invention.
Figure 6C:
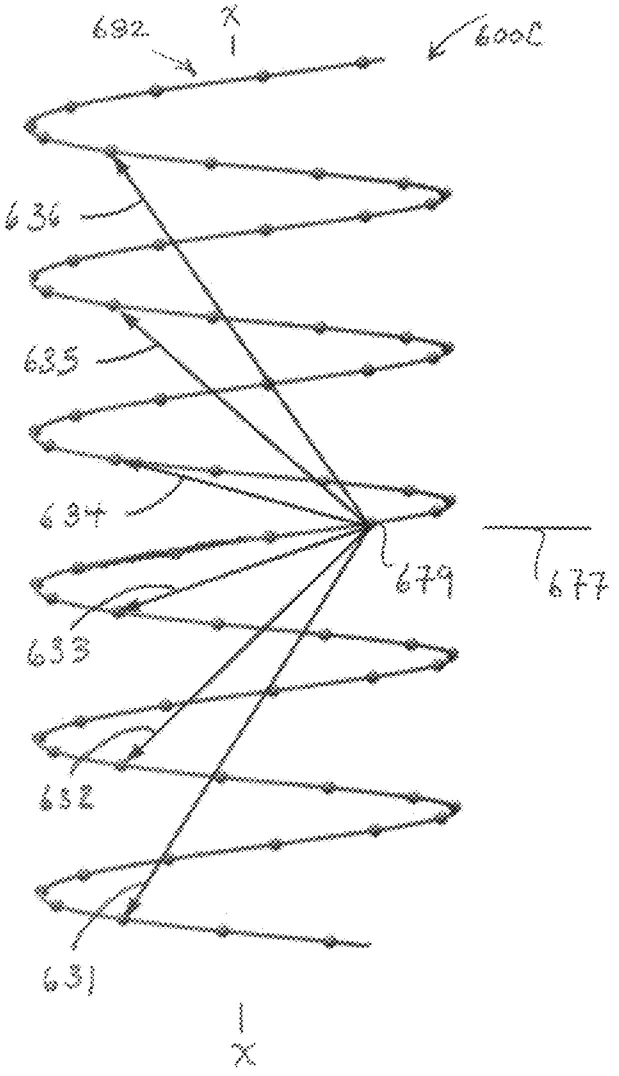
Figure 6A:
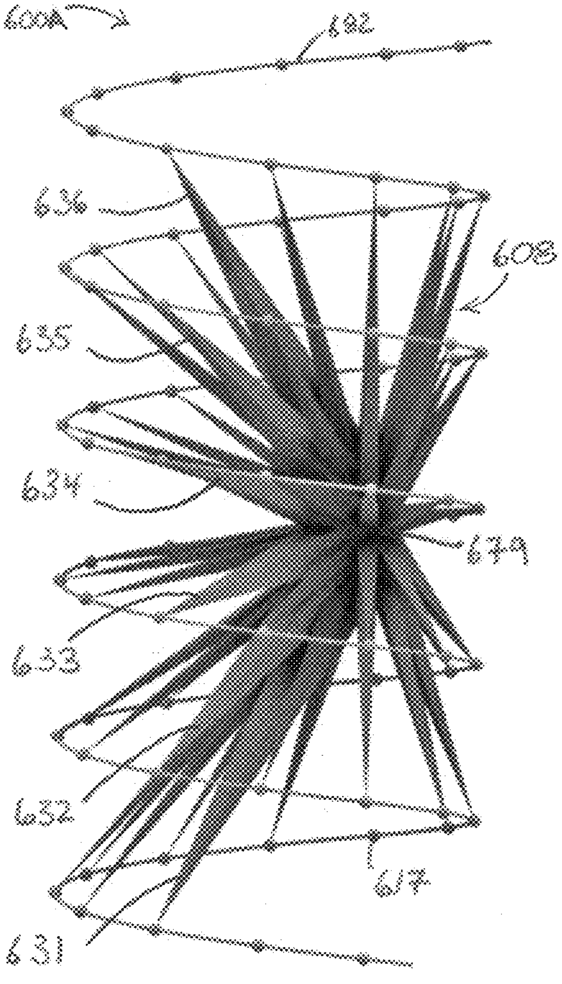
Figure 6D:
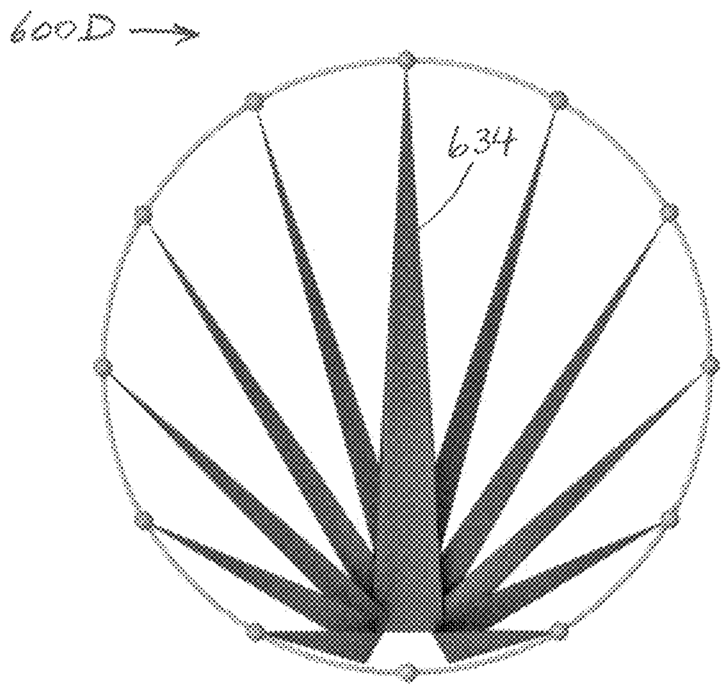

As shown in FIG. 6A, a starburst harmony spiral 600A may include a starburst or multi-lotus construct 608 within a harmony or multi-octave spiral 682. As described below, the starburst may be constructed, in a manner of speaking, by stacking loti in an octave spiral. As shown, there are six plumes 631-636 that are the central plumes of six loti and each of the plumes emanates away from a common starburst root note 679 at a starburst midplane 677.

FIG. 6B shows a portion of the FIG. 6A multi-octave spiral 600B. The portion shown 619 includes an octave of 12 notes, the notes being represented by marks 617 that are equally spaced around the spiral.

FIG. 6C shows the FIG. 6A multi-octave spiral 600C. In the spiral 682, six lines or plumes indicate starburst root note intervals, each interval spanning between the common starburst root note 679 and a central note of a respective octave. The starburst root note lies in a starburst midplane 677 that is about perpendicular to a spiral axis x-x. As shown, there are three lower intervals 631-633 in three lower octaves and three upper intervals 634-636 in three upper octaves.

Where as here, a common root note 679 is used in connection with each of the intervals 631-636, one note of each octave above and below the starburst root note 679 is unused as it is replaced by the starburst root note. See for example the exemplary unused note 617 in the lowest octave or partial octave of FIG. 6A.

In the spiral 682 of FIG. 6A, right asymmetric, and left asymmetric loti are formed. These loti are octaves of the spiral that are collapsed to form a planar figure. For example, in FIG. 6D, a right asymmetric lotus characteristic of an upper octave (see e.g. 634) 600D is shown. As indicated by the corresponding tabulation of lotus plumes, intervals to the left of the root interval 635 have hues matching those of a symmetric lotus while intervals to the right of the root interval swap 2nd and 3rd interval hues and swap 4th and 5th interval hues.

Figure 6E:
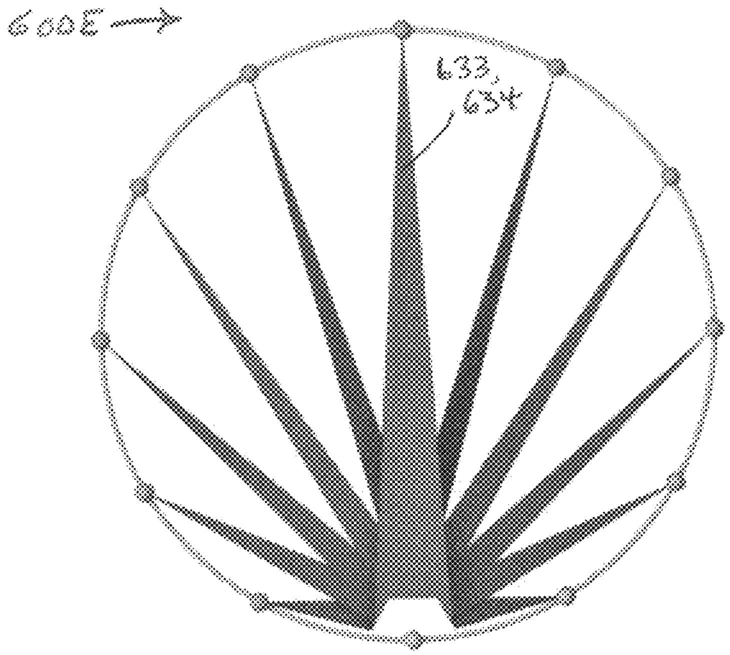
Figure 6F:
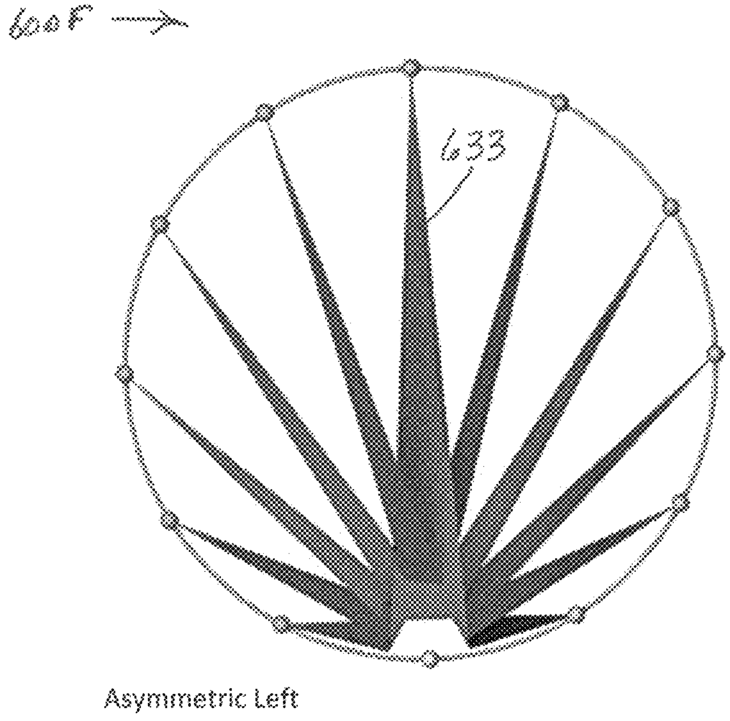

In FIG. 6F, a left asymmetric lotus characteristic of a lower octave 631-633 is shown 600F. As indicated by the corresponding tabulation of lotus plumes, intervals to the right of the root interval 633 have hues matching those of a symmetric lotus while intervals to the left of the root interval swap 2nd and 3rd interval hues and swap 4th and 5th interval hues as compared to the symmetric lotus.

In FIG. 6E, a symmetric lotus is shown 600E. This lotus is formed by the starburst root note 679 and the six notes to either side of the starburst root note. Notably, unlike asymmetric loti that fill upper and lower octaves, the symmetric lotus includes the adjoining symmetric portions of the first upper right asymmetric lotus and the first lower left asymmetric lotus. Because the symmetric lotus octave includes notes to either side of the starburst root note, all of the notes in this octave are used. And, because octaves other than the symmetric lotus octave do not include the starburst root note, one note of each such octave is not used.

Figure 7:
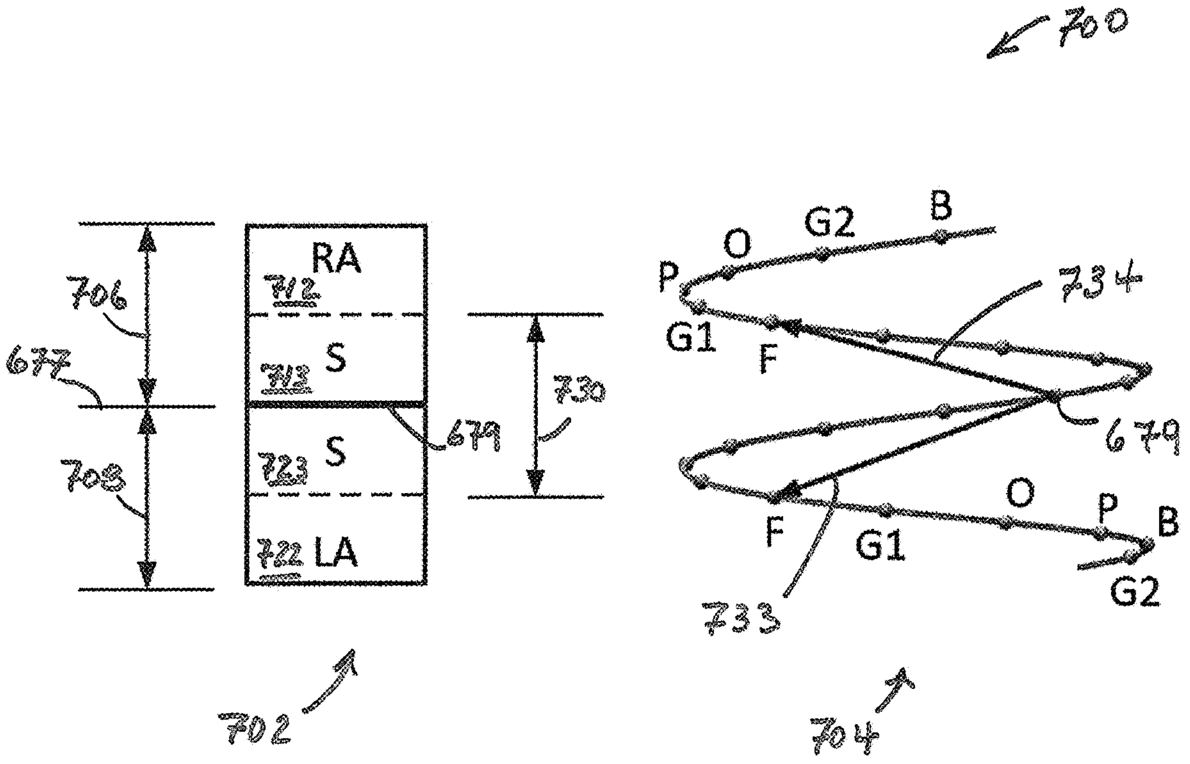

FIG. 7 illustrates construction of an exemplary starburst harmony spiral including two octaves 700.

At left is a schematic 702 of upper and lower octaves 706, 708 joined at a common spiral root note 679 at a starburst midplane 677. The upper octave 706 includes a right asymmetric portion 712 and a left symmetric portion 713. The lower octave 708 includes a right symmetric portion 723 and a left asymmetric portion 722. About the midplane 677 the left symmetric octave 713 and the right symmetric octave 723 are joined at the common spiral root note 679 to form a symmetric octave 730.

At right is a harmony spiral 704 including the two octaves 706, 708 joined at the common spiral root note 679.

The spiral display of the upper octave 706 may be collapsed to form a right asymmetric lotus with a central plume 734. The octave asymmetric portion 712 has a note color sequence of B-G2-O-P-G1-F.

The spiral display of the lower octave 708 may be collapsed to form a left asymmetric lotus with a central plume 733. The octave asymmetric portion 722 has a note color sequence of G2-B-P-O-G1-F.

At the starburst root note 679 the symmetric portions 713, 723 of the octaves 706, 708 are joined. Together, these symmetric octave portions may be collapsed to form a symmetric lotus, for example a lotus with a central plume that superposes plumes of the upper and lower octaves 733, 734.

As used herein, applicant coins the term “normal starburst” to refer to a particular starburst, that is to a starburst including a right asymmetric lotus joined to a left asymmetric starburst at a common root note.

Turning now to the construction of triad chords, each such chord may be represented by a triangle where each edge of the triangle is an interval between notes on a harmony spiral. As explained below, these trial intervals result from the intersections of starbursts such as the starbursts described above.

Figure 8C:
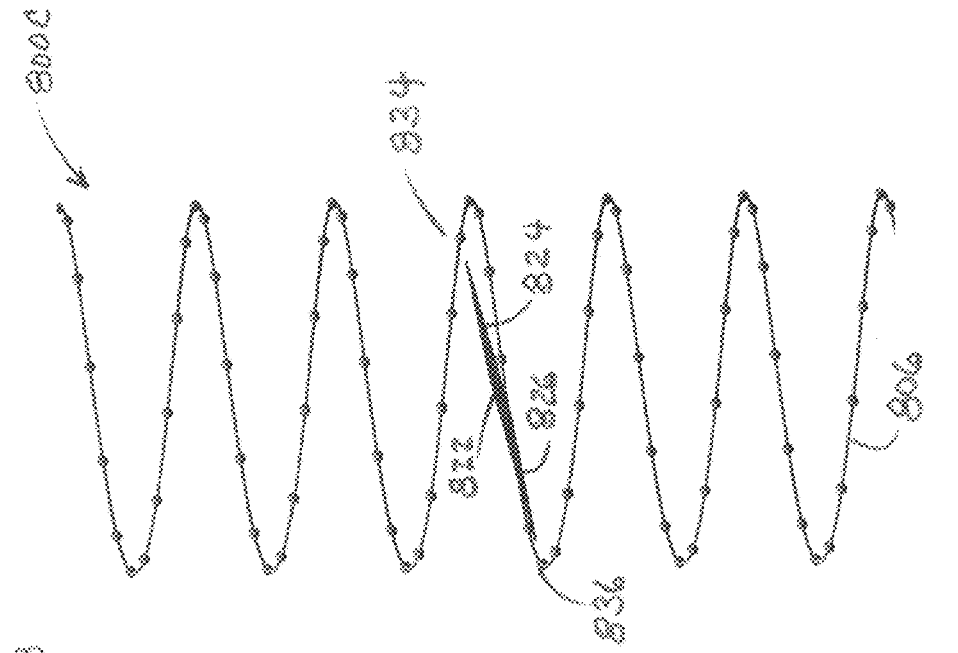
FIGS. 8A-C show interval formation from intersecting starbursts of the present invention.
Figure 8B:
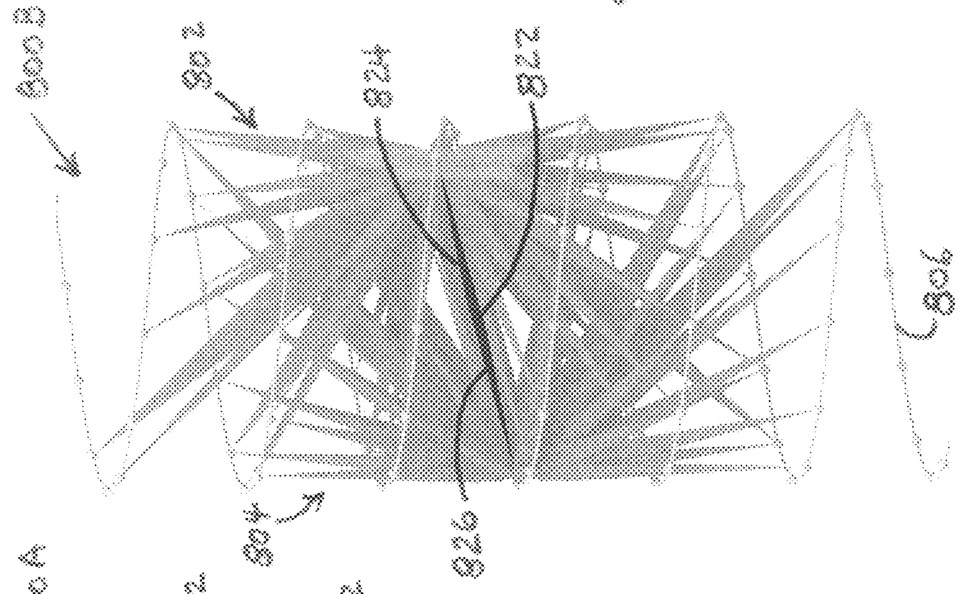
Figure 8A:
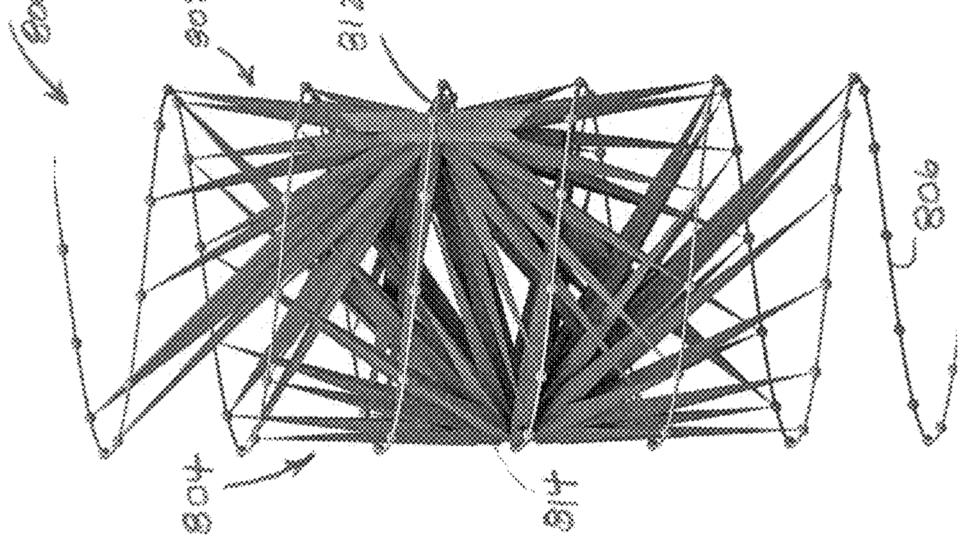

FIG. 8A shows exemplary intersecting starbursts 800A. Here, two starbursts 802, 804 having corresponding root notes 812, 814 are located in a harmony spiral 806. Where the two starbursts intersect may be determined by the starburst location within the harmony spiral 806. In various embodiments, two intersecting starbursts intersect along but a single line that extends between notes on the harmony spiral.

FIG. 8B shows a first view of the intersection 800B of the two starbursts of FIG. 8A. Here, the intersection of first and second starbursts 802, 804 occurs along but a single line 822. In an exemplary intersection, the intersection occurs along a line formed by the intersection of i) a plume 824 of a first note e.g., G2 in the first starburst and ii) a plume 826 of a second note e.g., G2 in the second starburst.

FIG. 8C shows a second view of the intersection 800C of the two starbursts of FIG. 8A. Here, only the intersecting plumes 824, 826 are shown to better illustrate the corresponding notes 834, 836 that the intersecting plumes extend between. As mentioned above and as further described below, these intersecting plumes may be used to determine a side of a triad chord.

Figure 9A:
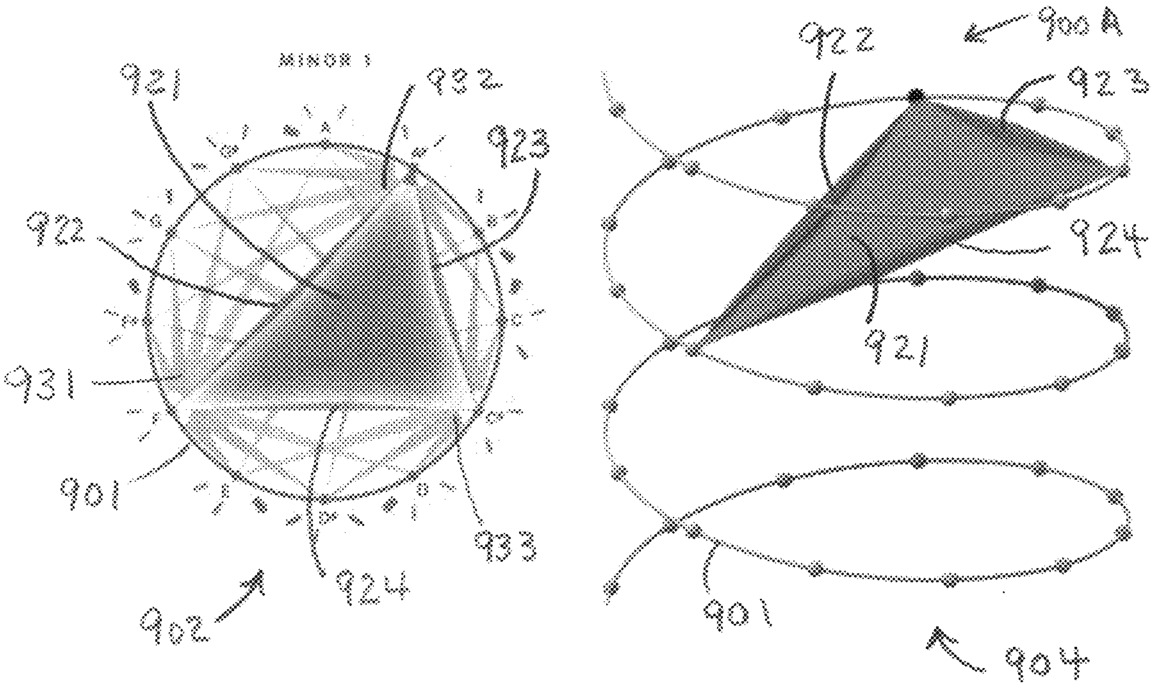
FIGS. 9A-C show formation of triad and composite chords of the present invention.
Figure 9B:
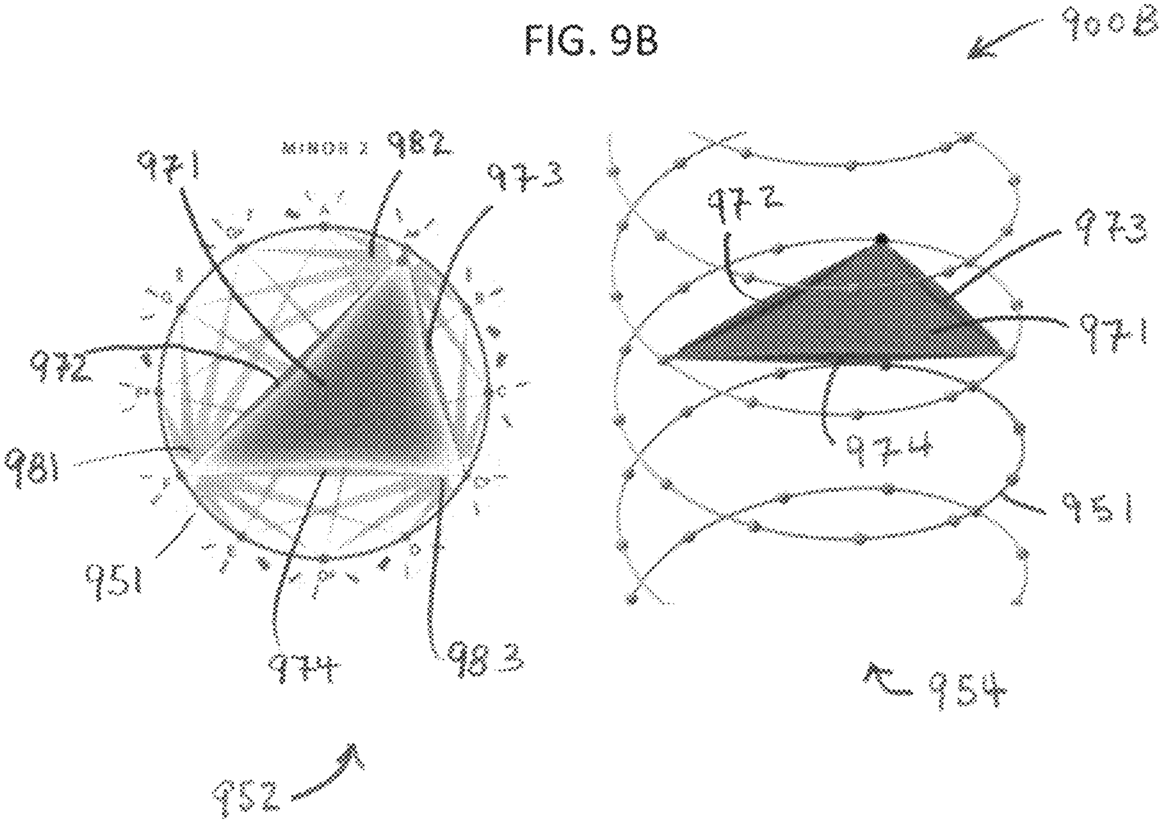
Figure 9C:
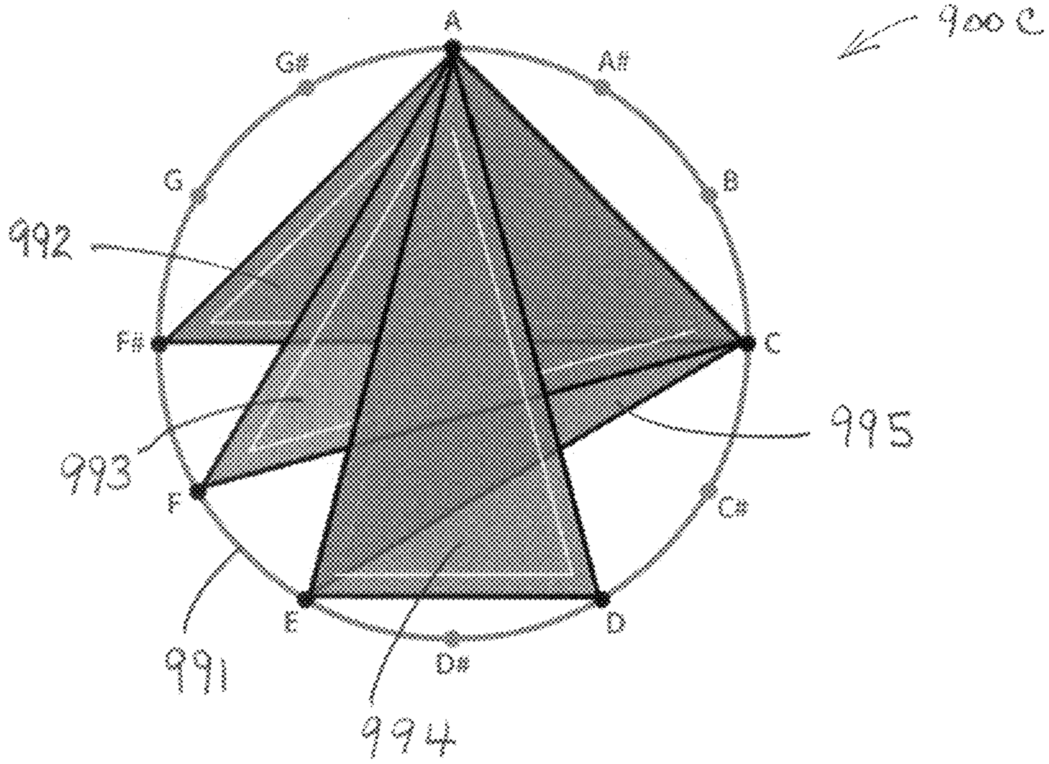

FIGS. 9A-C show triads formed from intervals and composite chords formed from triads 900A-C.

FIG. 9A shows the formation of a first triad chord 900A. At left is a planar view 902 of three intersecting starbursts 931-933 within a collapsed harmony spiral 901. At right is a perspective view 904 of the harmony spiral 901 showing the intersections of the 922-924 of the starbursts 931-933.

Here, intersections among the starbursts are i) 931 to 932 resulting in a first interval 922, ii) 932 to 933 resulting in a second interval 923, and iii) 933 to 931 resulting in a third interval 924.

These intervals are shown in the harmony spiral 901 and form a triad chord 921, for example a triad chord including the notes F-A#-C# in a first minor chord. As will be appreciated by skilled artisans, any triad chord may be constructed as a particularly colored geometric figure within the harmony spiral 901 such that a musician visualizes the chord from chord geometry, hue, and location within the harmony spiral.

FIG. 9B shows the formation of a second triad chord 900B. At left is a planar view 952 of three intersecting starbursts 981-983 within a collapsed harmony spiral 951. At right is a perspective view 954 of the harmony spiral 951 showing the intersections of the 972-974 of the starbursts 981-983.

In the planar view, intersections among the starbursts are i) 981 to 982 resulting in a first interval 972, ii) 982 to 983 resulting in a second interval 973, and iii) 983 to 981 resulting in a third interval 974.

These intervals are shown in the harmony spiral 951 and form a triad chord 971, for example a triad chord including the notes F-A#-C# in a second minor chord. As will be appreciated by skilled artisans, any triad chord may be constructed as a colored geometric figure within the harmony spiral 951 such that a musician visualizes the chord.

Hue variations of the intervals 922-924 (972-974) and triad chord 921 (971) are therefore associated with musical sounds such that a musician learns to "hear" the corresponding musical note combinations before the notes are actually played. Among other things, this "intuition" enables a musician to choose a next note to achieve a desired musical effect when note combination is played.

FIG. 9C shows a composite chord 900C. Here, multiple triad chords 992-995 are displayed in a harmony spiral 991. A first triad chord 992 includes the notes F#-A-C. A second triad chord 993 includes the notes F-C-A. A third triad chord 994 includes the notes E-A-D. A fourth triad chord includes the notes E-A-C. Where the triad chords have triad hues, the intersection of any two or more of these chords may result in a hue derived from the colors combined at the intersection.

Figure 10A:
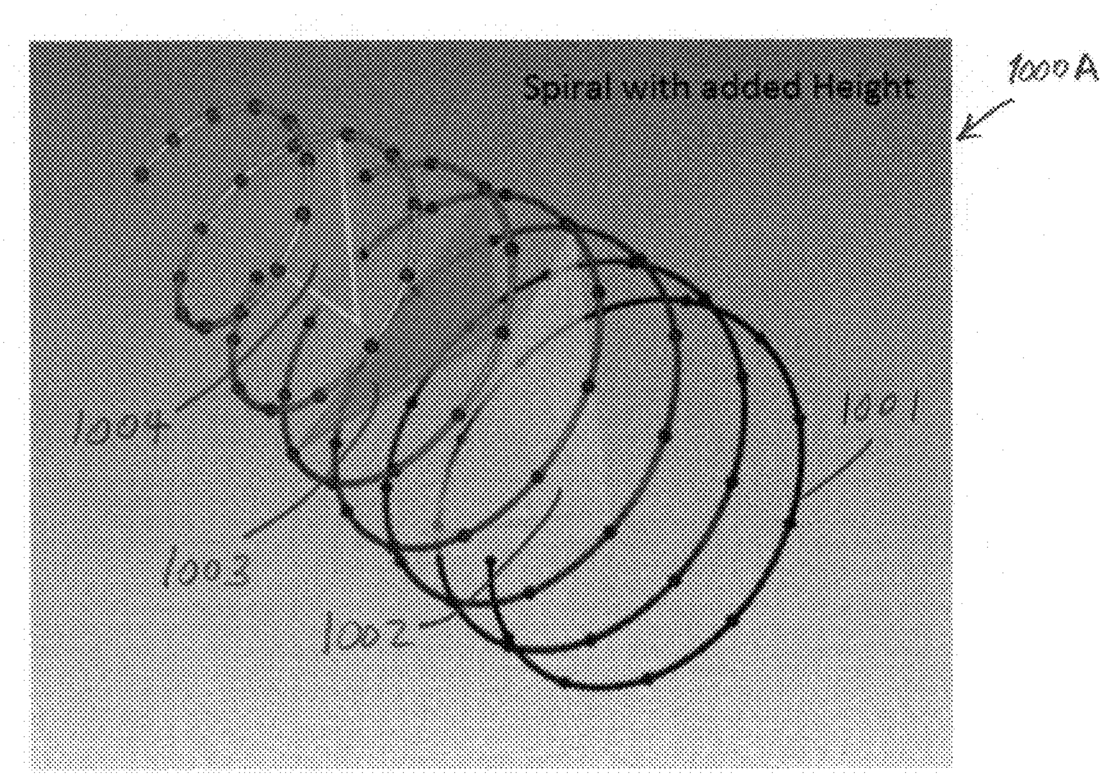
FIGS. 10A-C show harmony spirals of the present invention.
Figure 10B:
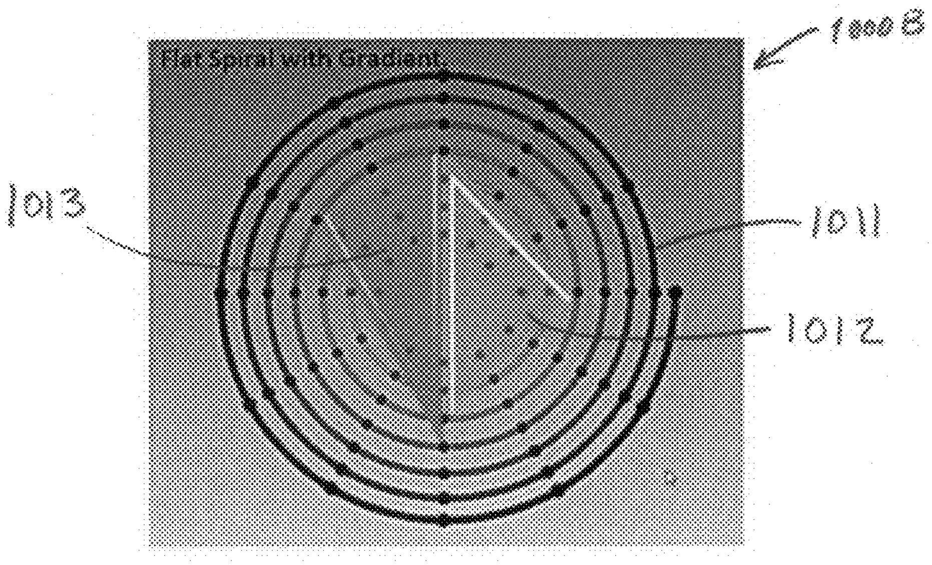

FIGS. 10A-B show exemplary harmony spirals 1000A-B. In FIG. 10A, a three dimensional harmony spiral is shown 1000A. Displayed within the spiral 1001 are three exemplary triad chords 1002-1004 that illustrate the visual presentation of triad chords within a spiral harmony construct. Any of the harmony constructions mentioned herein may utilize this three dimensional geometric harmony construct. Notably, any parameterized curve might be used in place of a three dimensional spiral to describe a harmony space.

In FIG. 10B, a two dimensional harmony spiral is shown 1000B. Displayed within the spiral 1011 are two exemplary triad chords 1012-1013 that illustrate the visual presentation of triad chords within a spiral harmony construct. Any of the harmony constructions mentioned herein may utilize this two dimensional geometric harmony construct. Notably, any parameterized curve might be used in place of a two dimensional spiral to describe a harmony space or plane.

Figure 10C:
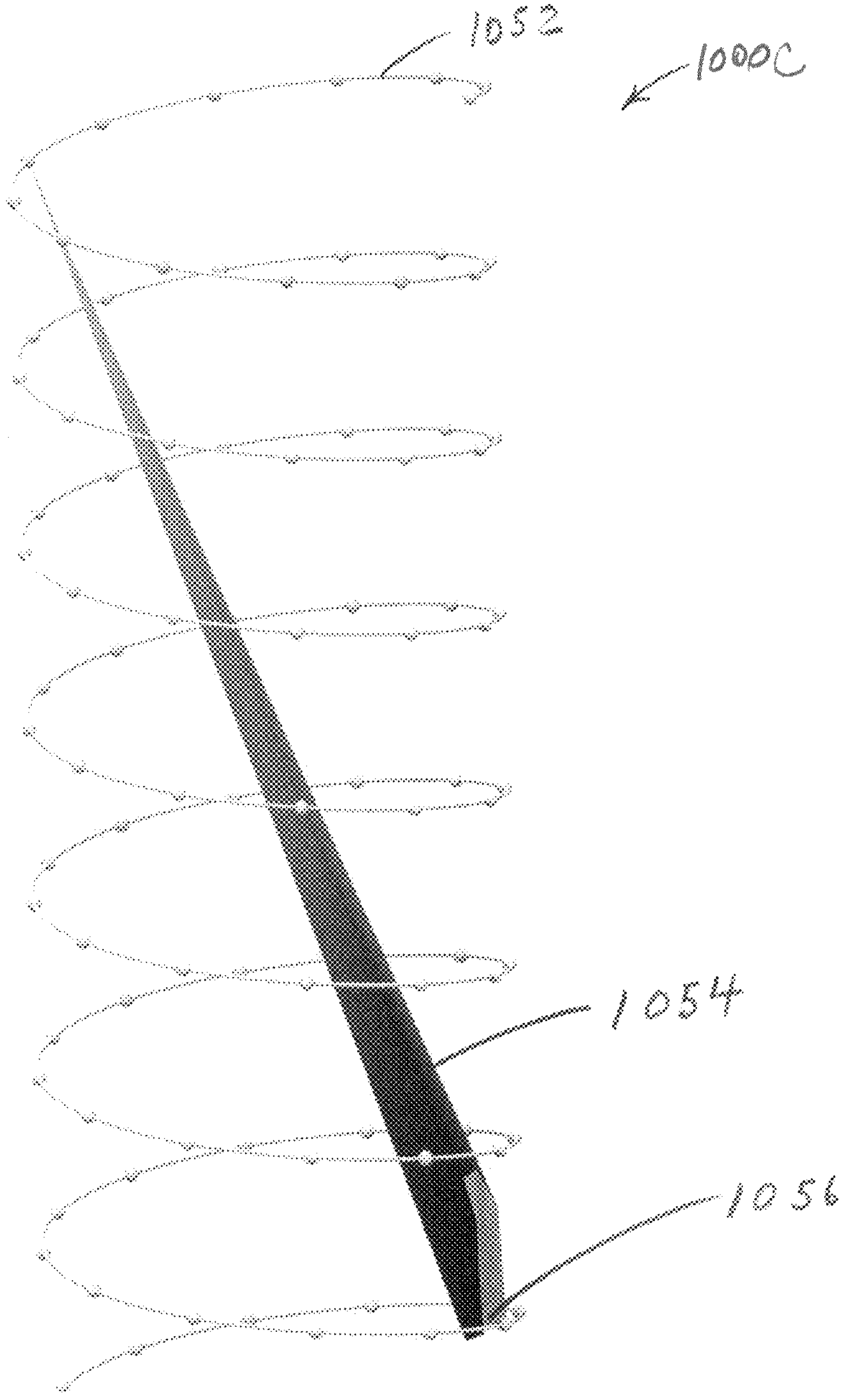

In FIG. 10C, a three dimension harmony spiral is shown 1000C. As see, a plume 1054 emanating from a root note 1056 is shown in the spiral 1052. Here the plume hue and/or lightness varies along its length with the hue being a washed out hue at an upper octave and a deep hue near the root note, for example a washed out fuchsia at an upper octave and a deep fuchsia near the root note. Any of the harmony constructions mentioned herein may utilize this three dimensional geometric harmony construct. Notably, any parameterized curve might be used in place of a three dimensional spiral to describe a harmony space.

Figure 11:
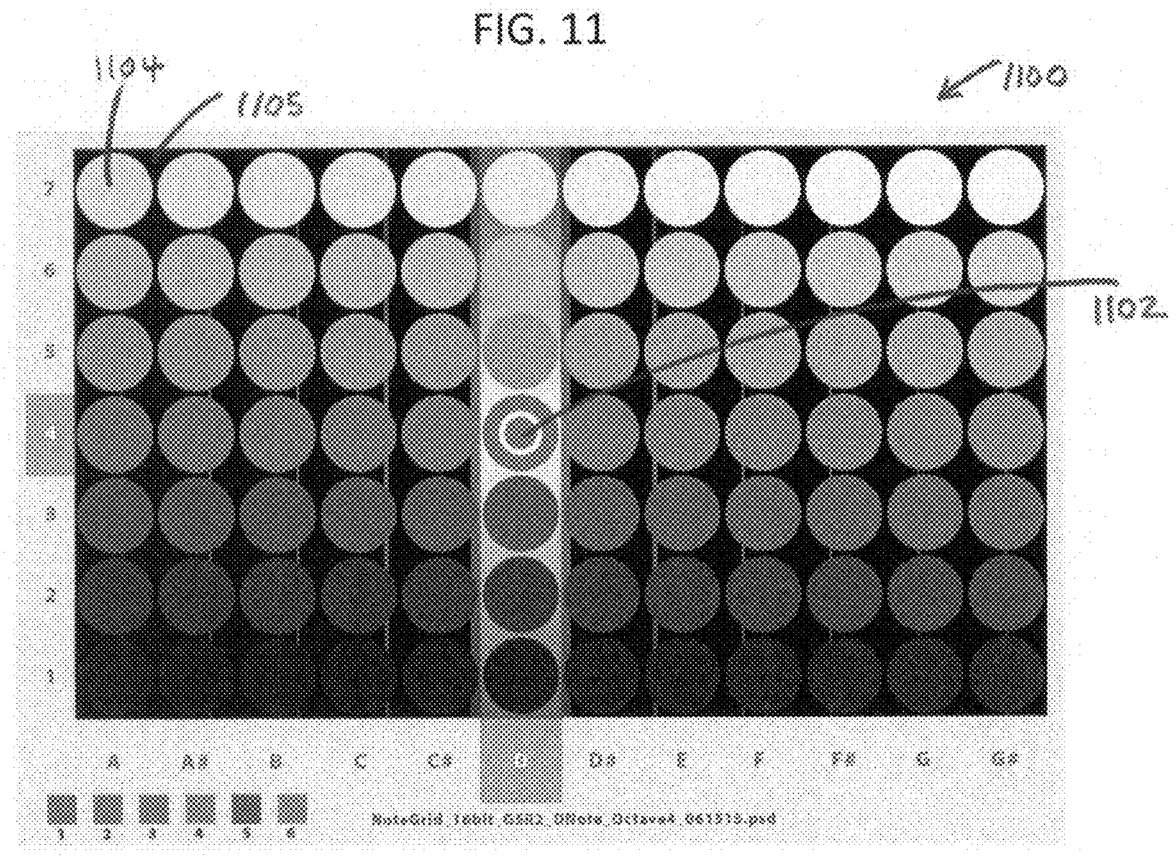
FIG. 11 and FIGS. 12A-B show note grids of the present invention.

FIG. 11 shows a note grid 1100. The note grid displays musical notes in a horizontal dimension and octaves in a vertical dimension against a dark background 1105. In various embodiments, the note grid is comparable with or conveys information similar to that of a planar representation of the curved outer layer of a harmony spiral.

While various shapes, objects, pictures, or the like might be chosen, here the notes of the note grid are indicated by a geometric figure, in this case a circle 1104. The note being played may, as here, be indicated by a marker such as a circle within the note. Here, the note being played 1102 is a D note in the fourth octave.

As seen in the column of the note being played, the notes are shaded with a light to dark gradient that lightens as the octave increase. Starburst interval hues are shown for all of the notes, behind the notes, which suggests to a musician the next sound to be selected. In each column other than the column of the note being played, frequency of the notes is indicated by note greyscale shading, from light at higher octaves to dark at lower octaves.

Figure 12A:
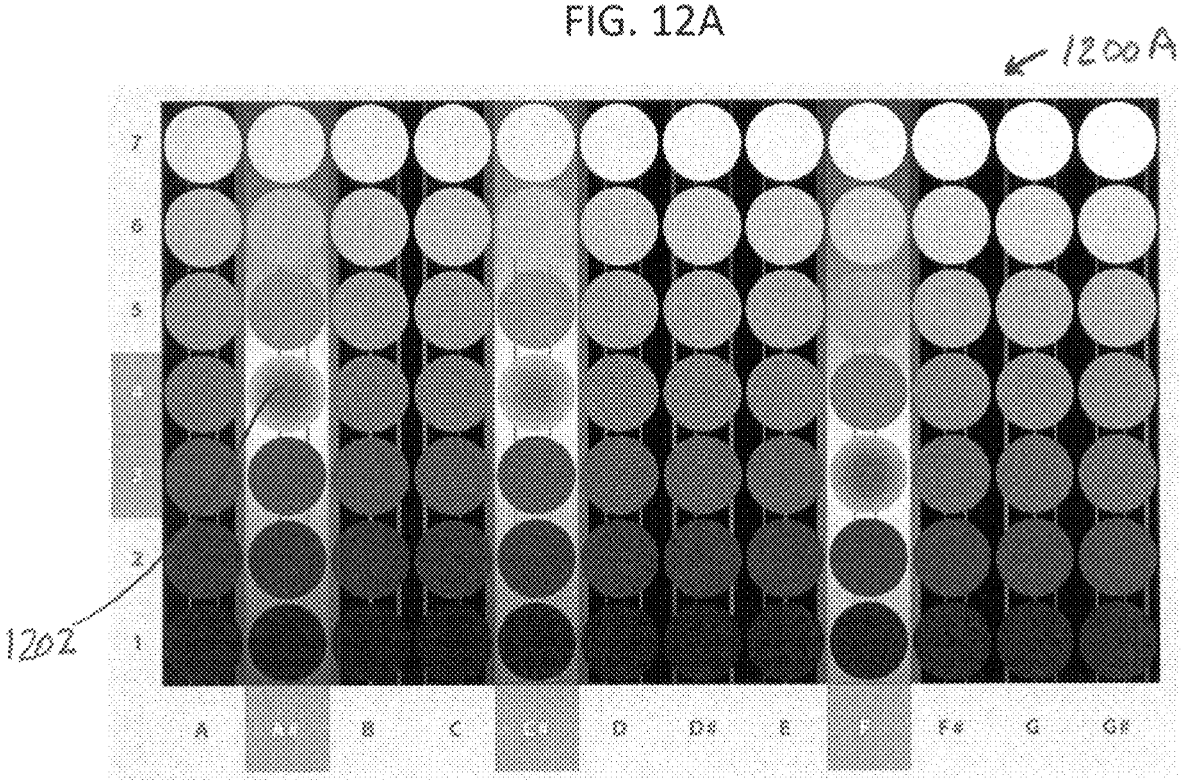
Figure 12B:
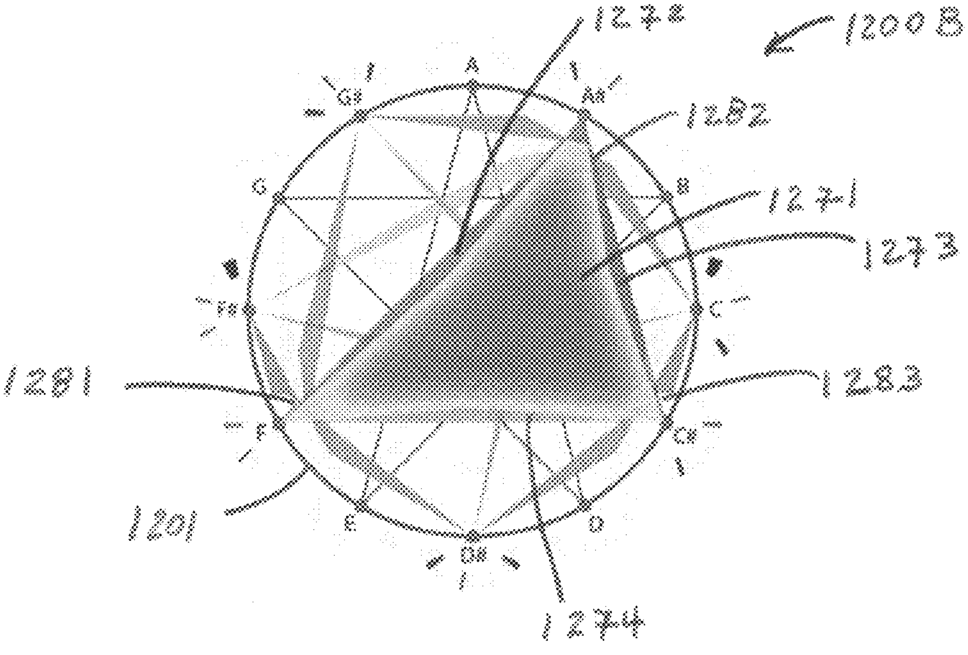
Figure 12C:
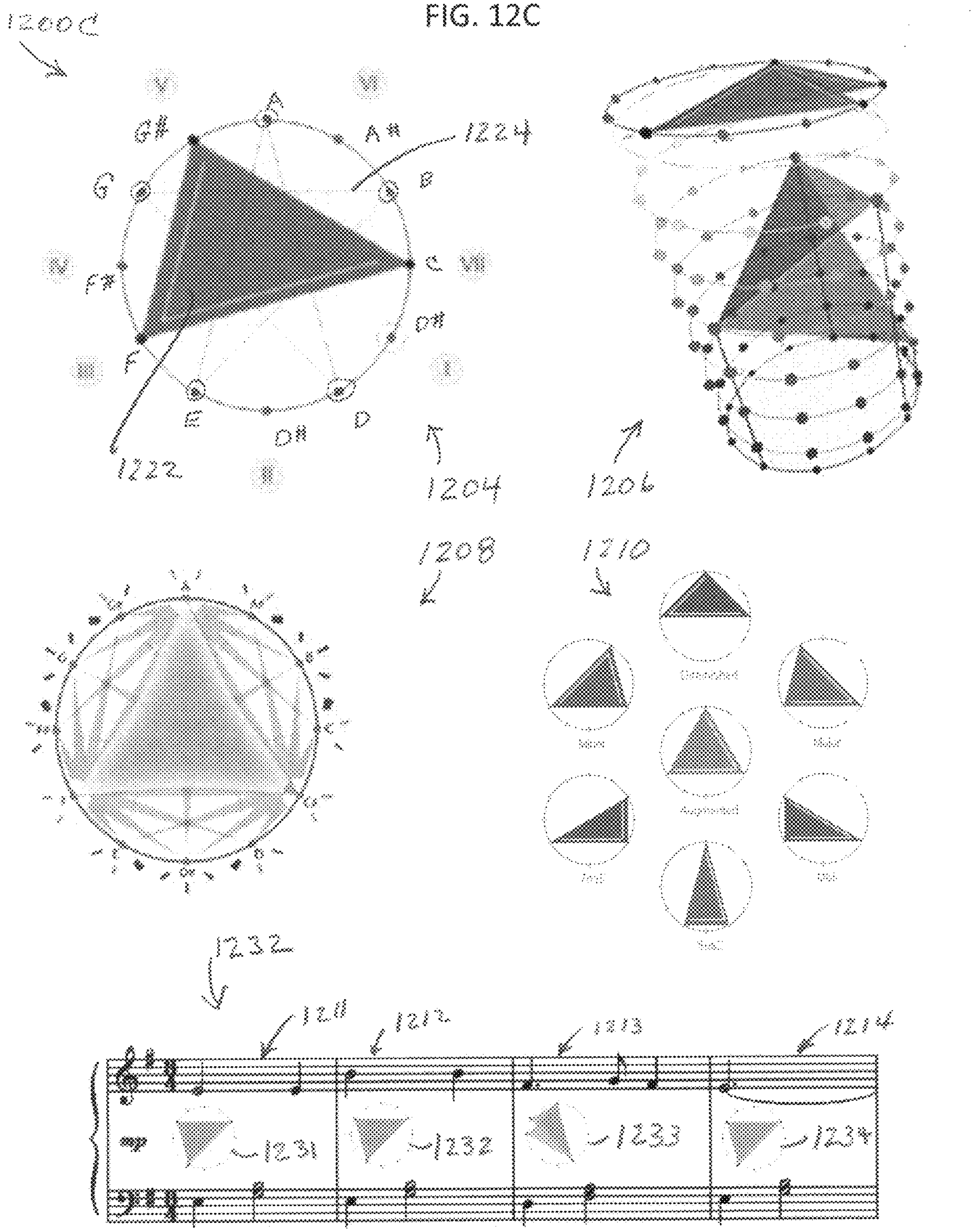
FIG. 12C shows exemplary transformations provided by the present invention.

FIGS. 12A-B show a note grid similar to that of FIG. 11 and a corresponding triad chord 1200A-B. As seen in the note grid of FIG. 12A, three notes are being played including notes A#-C# in the fourth octave and the note F in the third octave. Here, it is a gray inner cloud 1202 that indicates the note being played.

In the harmony spiral 1201 of FIG. 12B, the notes played are root notes of three starbursts 1281-1283. Intersections of these three starbursts result in three intervals 1272-1274 that determine a triad chord 1271.

As mentioned above, embodiments of the present invention provide a means for visualizing musical elements including musical notes, intervals, chords, and composite chords through the use of geometric figures with hue and/or greyscale coloration or shading indicative of the musical sound emulated. Musicians may work at composing, "listening to," and revising musical works utilizing any of, or a combination of any of, the loti, harmony spiral, and note grid geometric constructs.

For example, a computer(s) with display device(s) may display on one or on multiple screens any or all of these geometric constructs. In an embodiment, a computer display presents on a single screen at least one of each of a three dimensional harmony spiral, a note grid corresponding to the harmony spiral, and a lotus formed from an octave of the harmony spiral.

In the musical work: i) a first bar 1211 includes a half note E and a quarter note E and the first bar may be represented at least in part by a lotus filled with a triad chord 1231 sounding the note E; ii) a second bar 1212 includes a half note B and a quarter note B and the second bar may be represented at least in part by a lotus filled with a triad chord 1232 sounding the note B; iii) a third bar 1213 includes a dotted quarter note F, a ⅛ note G, a quarter note F and the third bar may be represented at least in part by a lotus filled with triad chords 1233 sounding the notes F and G; and, iv) a fourth bar 1214 includes a dotted half note E and the fourth bar may be represented at least in part by a lotus 1234 filled with a triad chord sounding the note E.

The first lotus 1204 provides, among other things, a chord visualization or selection tool. Having constructed a chord 1222, skilled artisans will recognize that the included pentagon in the form of a star 1224 marks out notes that should not be played together with the triad chord 1222. The harmony parameterized curve 1206 shows several chords including chords that span multiple octaves; as mentioned above, a corresponding note grid may also be displayed. The second lotus 1208 shows the formation of a triad chord from starbursts. These tools provide means for visualizing, composing, and editing the musical work 1212.

Where the musical work 1212 is being composed, the first lotus 1204 and the harmony parameterized curve may be used to visualize the movement from a first note or chord to a different second note or chord as in the movement between the first and second bars 1211-1212. Chord hues indicative of the sounds of chords of the chord library 1210 may aid in this or related selection(s).

In an embodiment, a user begins with a particular note or chord and utilizes geometric figures with particular hues such as notes or triad cords of a harmony parameterized curve to select a movement to a second note or chord. In an embodiment, chords within the harmony parameterized curve are formed from normal starbursts. As the user progresses, a transformation and/or decoding of the geometric figures with particular hues may be used i) to fill in the staff musical notation with the corresponding notes or ii) an associated music player may play the note(s) and/or chord(s). As such, there is a transformation of colored figures with particular hues selected using the tools to music in staff notation.

As seen above, visualization of a musical work may include transformations and/or decoding of geometric figures with particular hues presented in a harmony parameterized curve to staff musical notation and vice versa.

FIGS. 13A-H show a rhythm system 1300A-1300H. As seen in rhythm system display of FIG. 13A, the rhythm may include one or more of a time circle 1302 with peripheral time increments 1304. The time circle encloses geometric figures such as polygons, for example a polygon 1312 having vertices near, touching, or tangent to the time circle. In some embodiments, plural polygons are superimposed. A time marker 1308 marks a radial path between a time circle center 1306 and a time circle increment or increment boundary 1318.

The time circle 1302 may be simulated or replaced by a continuous tape such a tape formed when the time circle is broken and extended to form a linear element with polygon 1312 vertices 1314 located and spaced to indicate timing.

Increments of time 1302 may be quantized such that polygon vertices 1314 sit at only particular points on the time circle, for example in the manner of a snap fit or snap to grid. As skilled artisans will understand, digital computers typically operate in a quantized manner and rational number representations of position on the time circle may therefore provide what is nearly but not actually a continuous representation of time or change of time.

Tempo is typically measured in Beats Per Minute ("BPM") and a tempo control 1320 may be varied over time which allows a user to set a particular tempo, for example 125, and subsequently adjust this tempo as the rhythm system 1300A runs.

In various embodiments, a circumference of or indicated on the time circle 1302 will be equal to a certain musical distance, for example a measure of music such a measure of 16 beats. Alternatively, the time circle circumference may indicate a bar of music, for example a bar of 4 beats. Here, a point in the rhythm layers may be chosen for attachment of a rhythm driver to the time circle to relate distance to beats providing a particular ration of distance to beats.

An exemplary quantization provides that between any two beats, time may be divided by a quantization factor. This factor will be a product of primes—i.e. 2^n1*3^n2*5^n3 . . . where n is 0 . . . m and where m is an integer.

Where an embodiment lacks quantization, playback may occur as with an effectively continuous tape where quantization intervals are small enough to mimic continuous playback.

In order to support song structure, time circles may be nested as in a tree like structure. For example, a large circle can represent a movement and can contain an integral number of sub-circles. These sub-circles can also contain sub-sub-circles and so on to provide a desired number of levels. This tree structure may be controlled with a layer interface to create sub-layers. At a selected point in the structure of sub-layers, a beat driver is attached to i) connect the BPM setting, ii) distance around the circles, iii) set the speed of time, and iv) determine the point where quantization will be applied. With these features, a rhythm system may represent a single movement of music, for example a movement of music with a single bpm, quantization, and rhythm structure. More complex musical representations may utilize an orchestration system that connects multiple musical movements into more complex systems and may be represented as a graph.

Linear representations of time such as a note ribbon are similarly divided by quantization and rhythm structure. In an embodiment a note ribbon represents both continuous positioning, without snap to, and quantized positions with snap to such that a user selects one or the other.

FIGS. 13B-H illustrate methods of constructing a rhythm for a musical work or a portion of a musical work 1300B-H.

In various embodiments, a library of geometric shapes such as planar geometric shapes including one or more of polygons with a plurality of sides such as a triangle, square, pentagon, hexagon and the like is provided. These shapes include ones having vertices such as quantity n vertices where each vertex is associated with a musical voice.

Figure 13A:
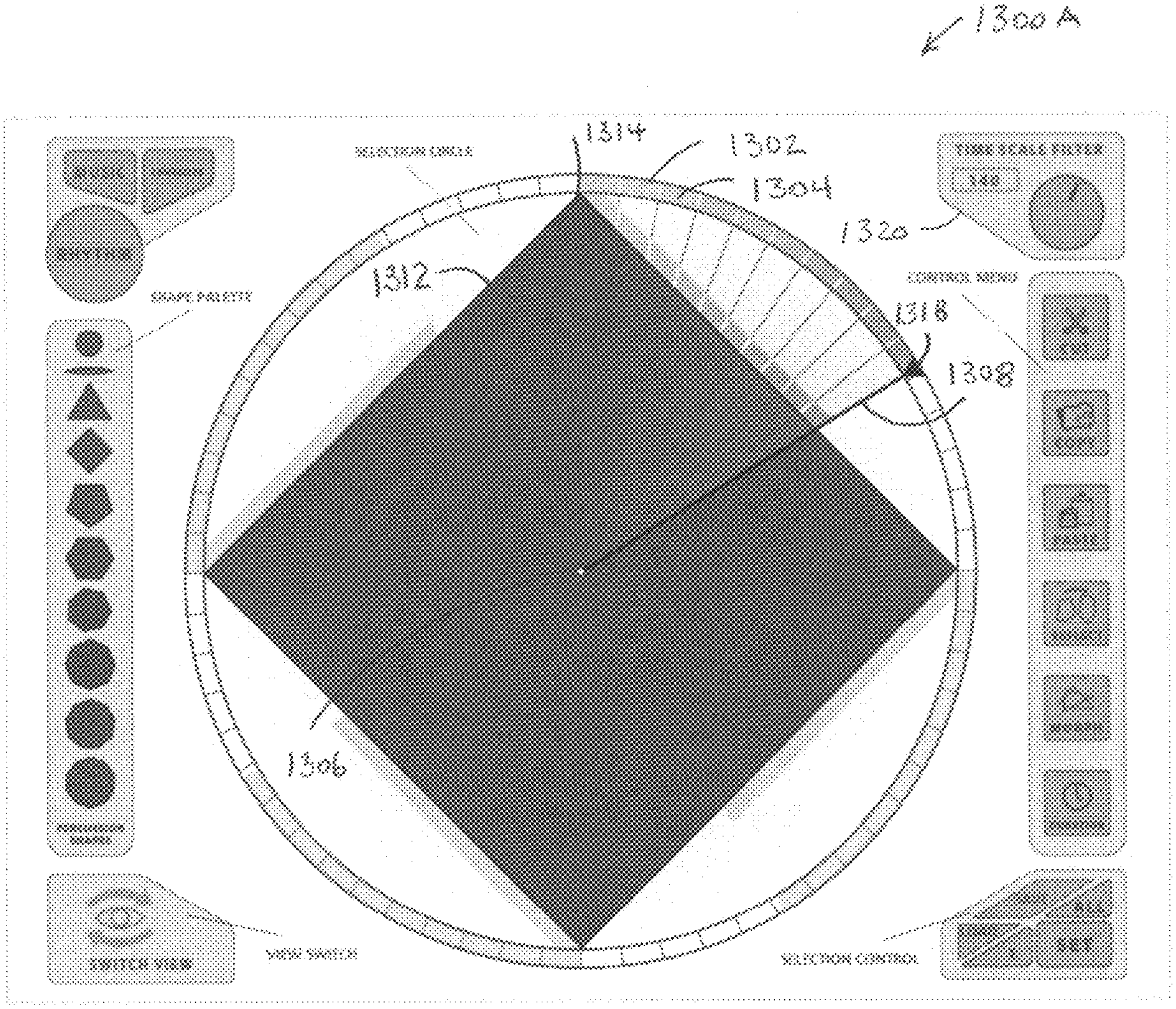
FIGS. 13A-H show a rhythm system of the present invention.
Figure 13B:
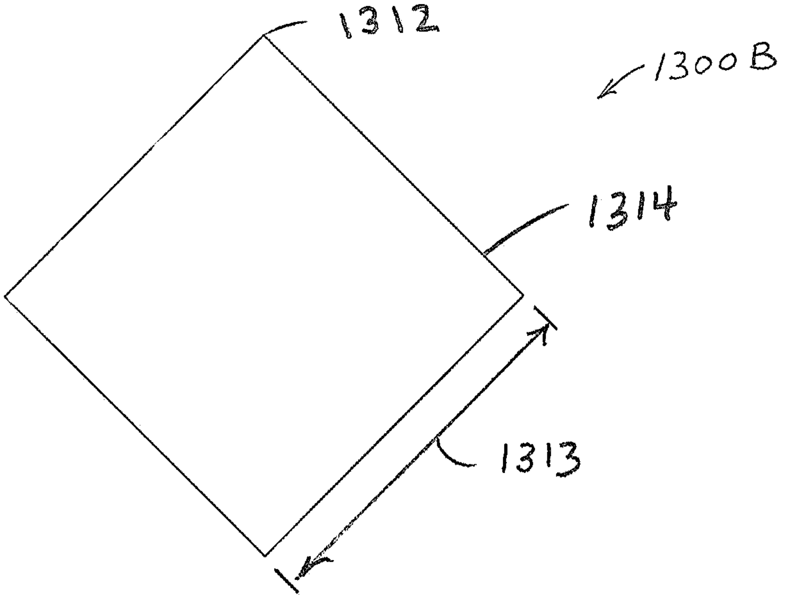

FIG. 13B shows a rhythmic geometric shape in the form of a square 1314 having four vertices 1312.

The rhythm system may be used to compose one or multiple song layers. For example, a first song layer is composed that includes four rhythmic verses wherein each verse includes four phrase sets and is represented by four phrase set circles embedded in a verse circle such that each phrase set includes four phrases and is represented by four phrase circles embedded in a phrase set circle.

Figure 13C:
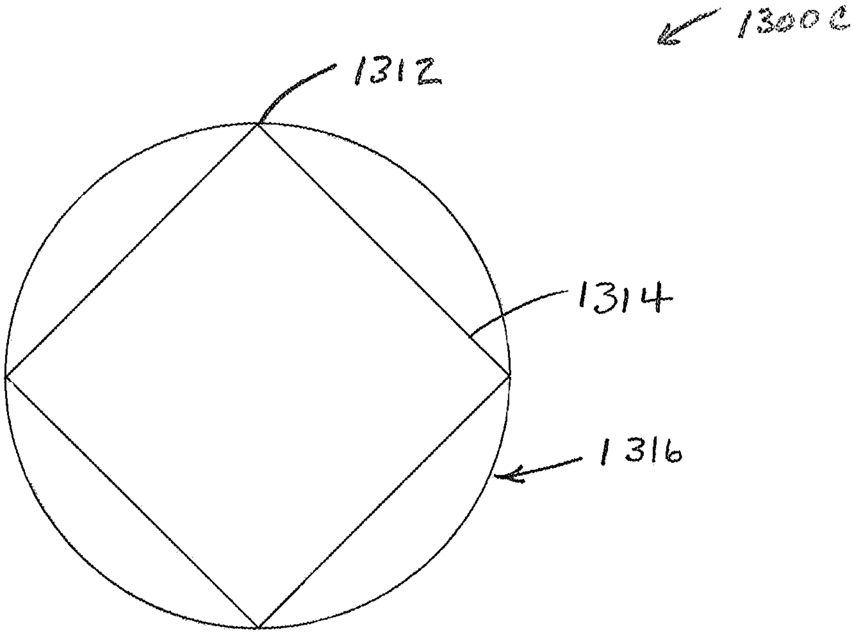

FIG. 13C illustrates a musical phrase using a phrase circle. It shows a shape circle 1316 and a geometric shape in the form of a square 1314 within the phrase circle. Vertices of the square 1312 are proximate the shape circle circumference.

Figure 13D:
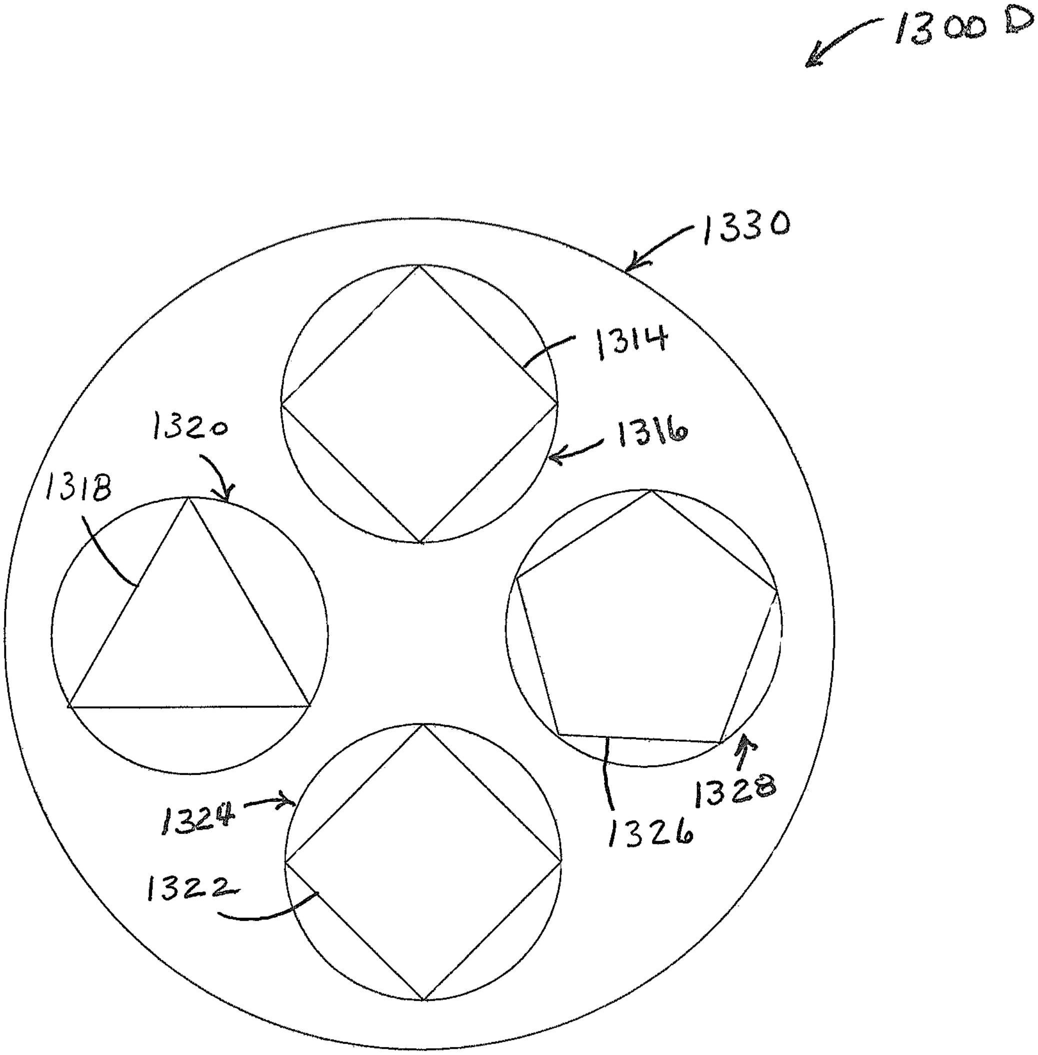

FIG. 13D illustrates a musical phrase set using a phrase set circle. It shows a phrase set circle 1330 with four shape circles 1316, 1320, 1324, 1328 within. Respective geometric shapes include a square 1314 within the first shape circle 1316, a triangle 1318 within the second shape circle 1320, a square 1322 within the third shape circle 1324, and a pentagon 1326 within the fourth shape circle 1328.

Figure 13E:
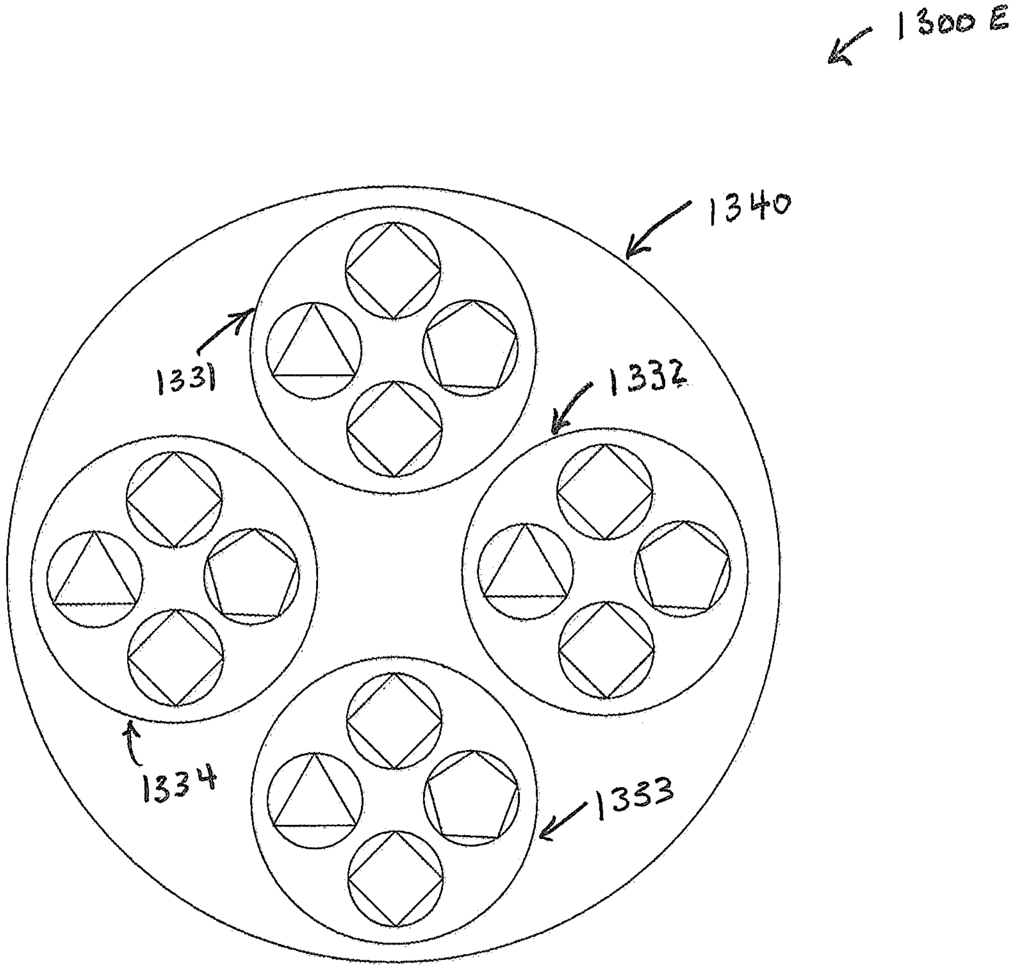

FIG. 13E illustrates a musical verse using a verse circle. It shows a verse circle 1340 with four phrase set circles 1331-1334 within.

Figure 13F:
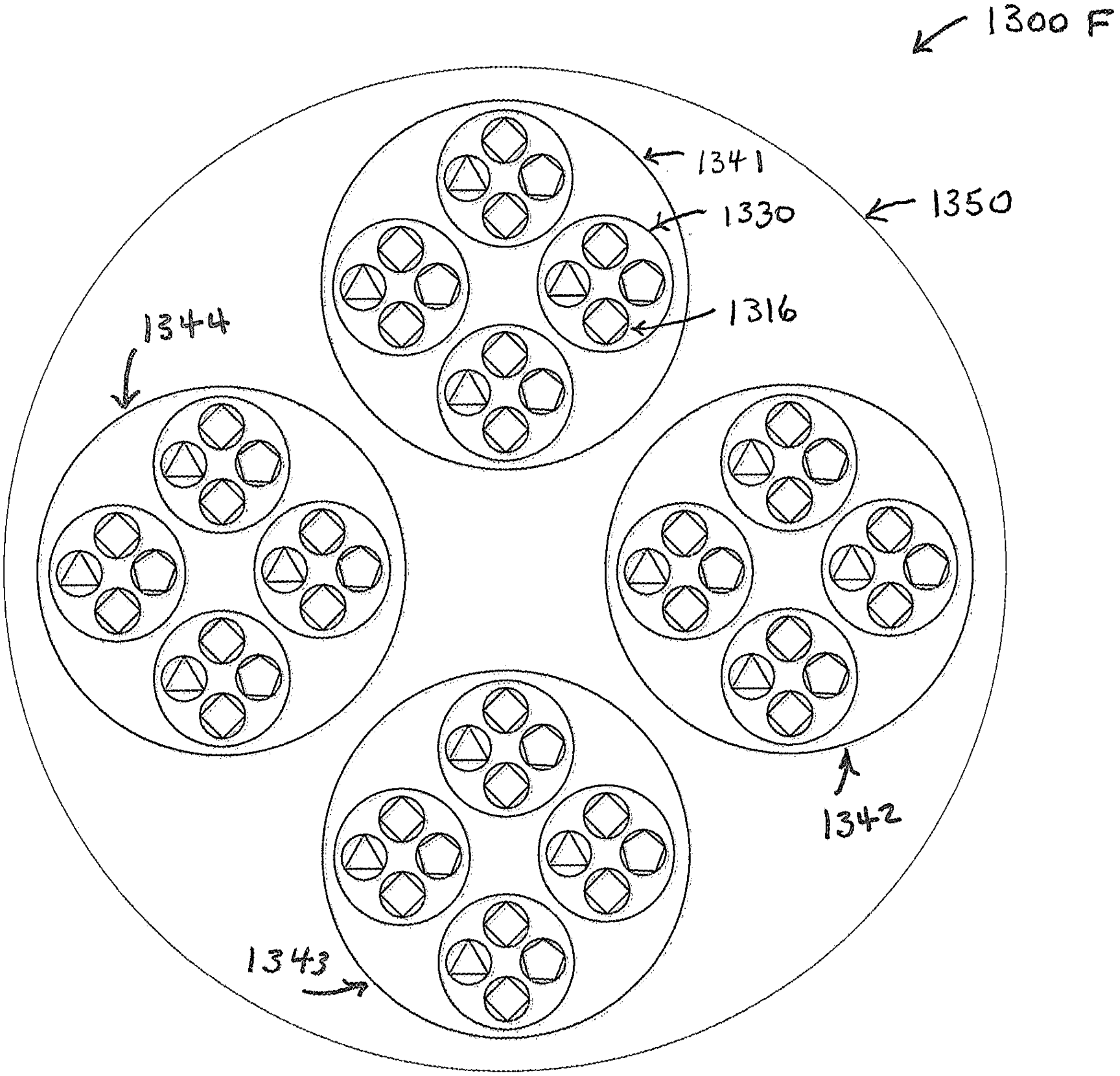

FIG. 13F illustrates a song layer using a song layer circle. It shows a first song layer circle 1350 with four verse circles 1341-1344 therein. As indicated, each verse circle includes four phrase set circles 1330 and each phrase set circle includes four shape circles 1316.

Each phrase includes four beats and is represented by a selected library shape (e.g. 1314) embedded in a shape circle. In a series of steps (i) verses are ordered in a selected verse sequence v1-v4, (ii) phrase sets are ordered within each verse in a selected verse-phrase set sequence ps1-ps4, (iii) phrases within each phrase set are ordered in a selected verse-phrase set-phrase sequence p1-p4, (iv) vertices within each phrase are ordered in a selected verse-phrase set-phrase-vertex sequence vx1-vxn.

The song layer rhythm may be played by sounding the voice of each vertex in order, beginning with (v1, ps1, p1, vx1) and ending with (v4, ps4, p4, vxn).

Figure 13G:
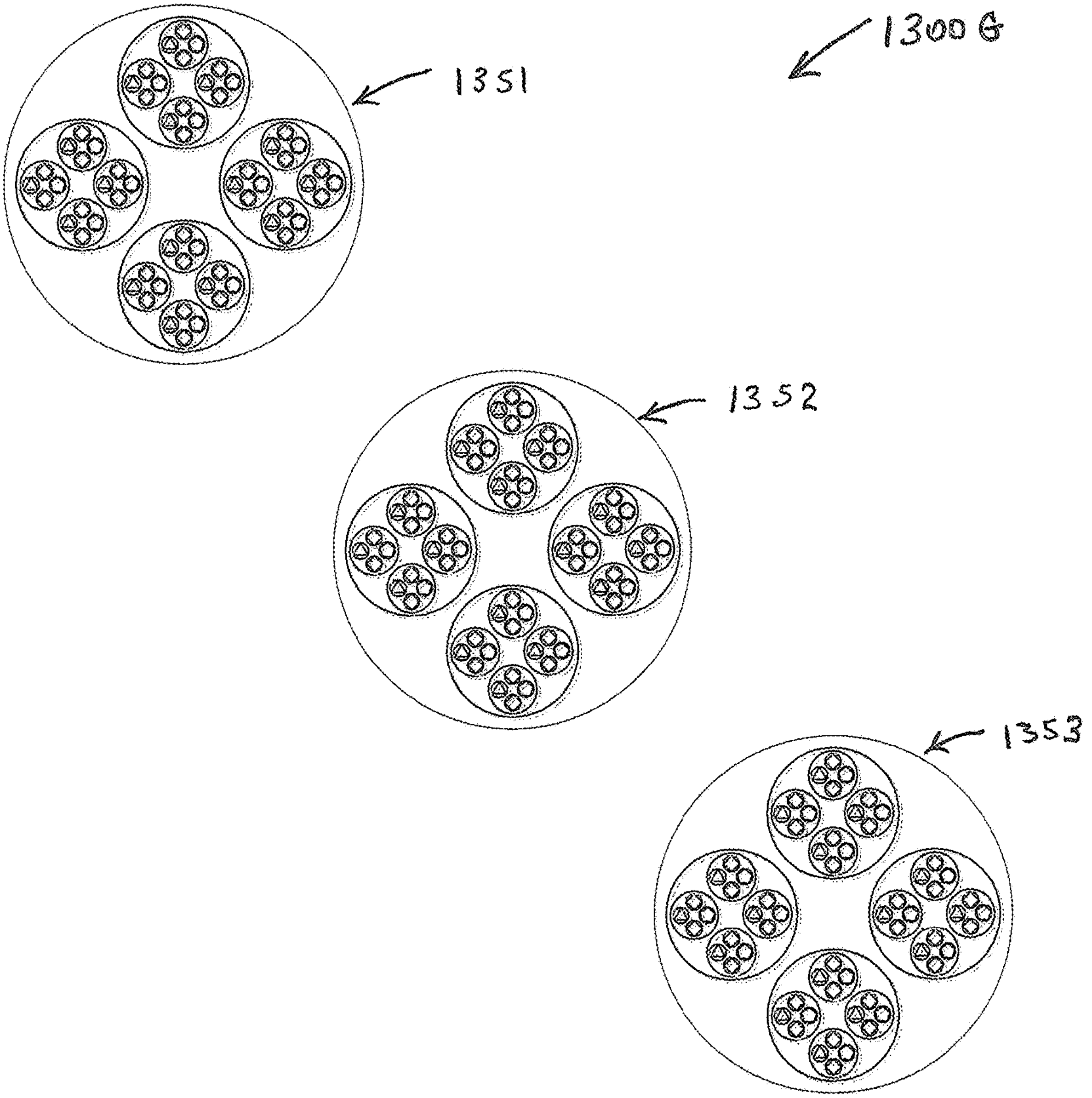
Figure 13H:
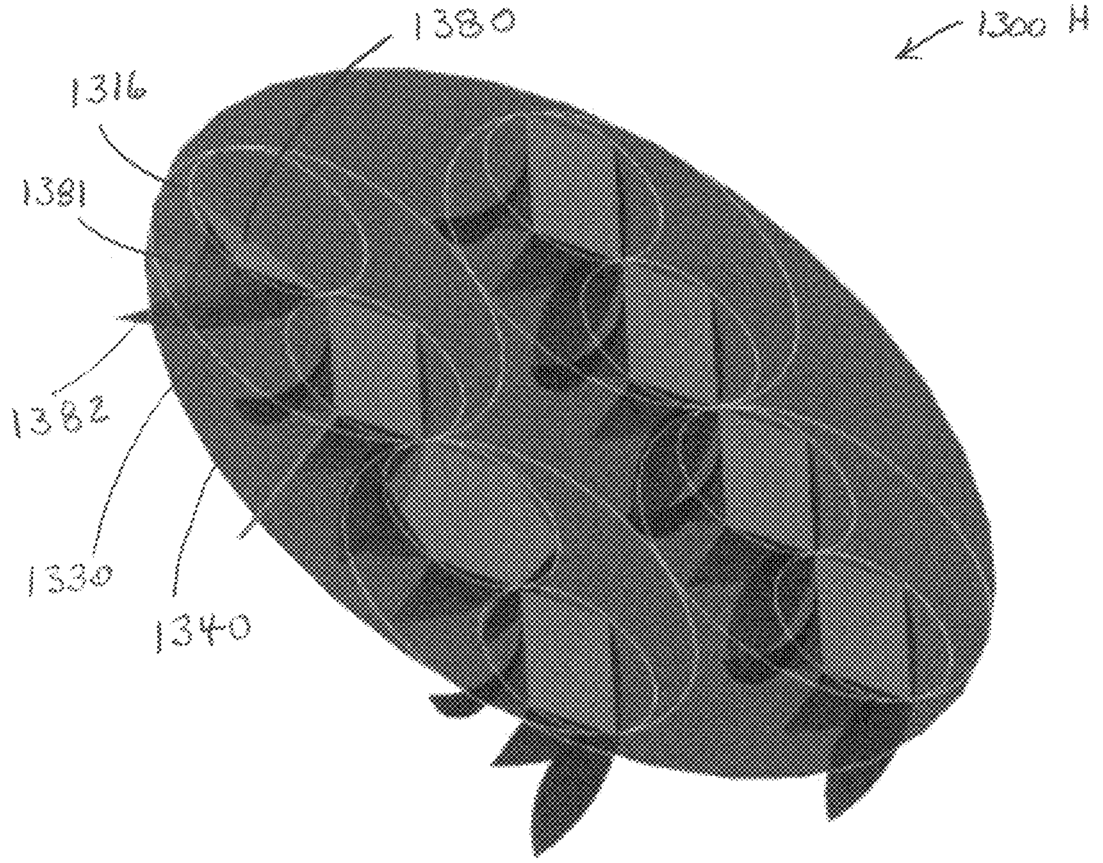

As seen in FIG. 13G, multiple song layers may be used to compose the rhythm for a more complex musical work. In particular, first, second and third song layers 1351-1353 may collectively represent a musical work where the song layers are played in an order chosen by the user.

In the above rhythm composition method, the manner of composing a rhythm may further comprise the step of using the distance between adjacent vertices (see e.g., distance 1313 of FIG. 13B) to indicate the time between sounding the voices of the adjacent vertices.

And, in the above method, the manner of composing a rhythm may further comprise the step of sounding the voice of a vertex for a time period indicated at least in part by an out-of-plane projection extending from the vertex. See for example FIG. 13 H which includes a planar geometric shape, here a triangle 1380 within a shape circle 1316 and an out-of-plane projection 1382 extending from a vertex 1381 of the triangle.

Figure 14:
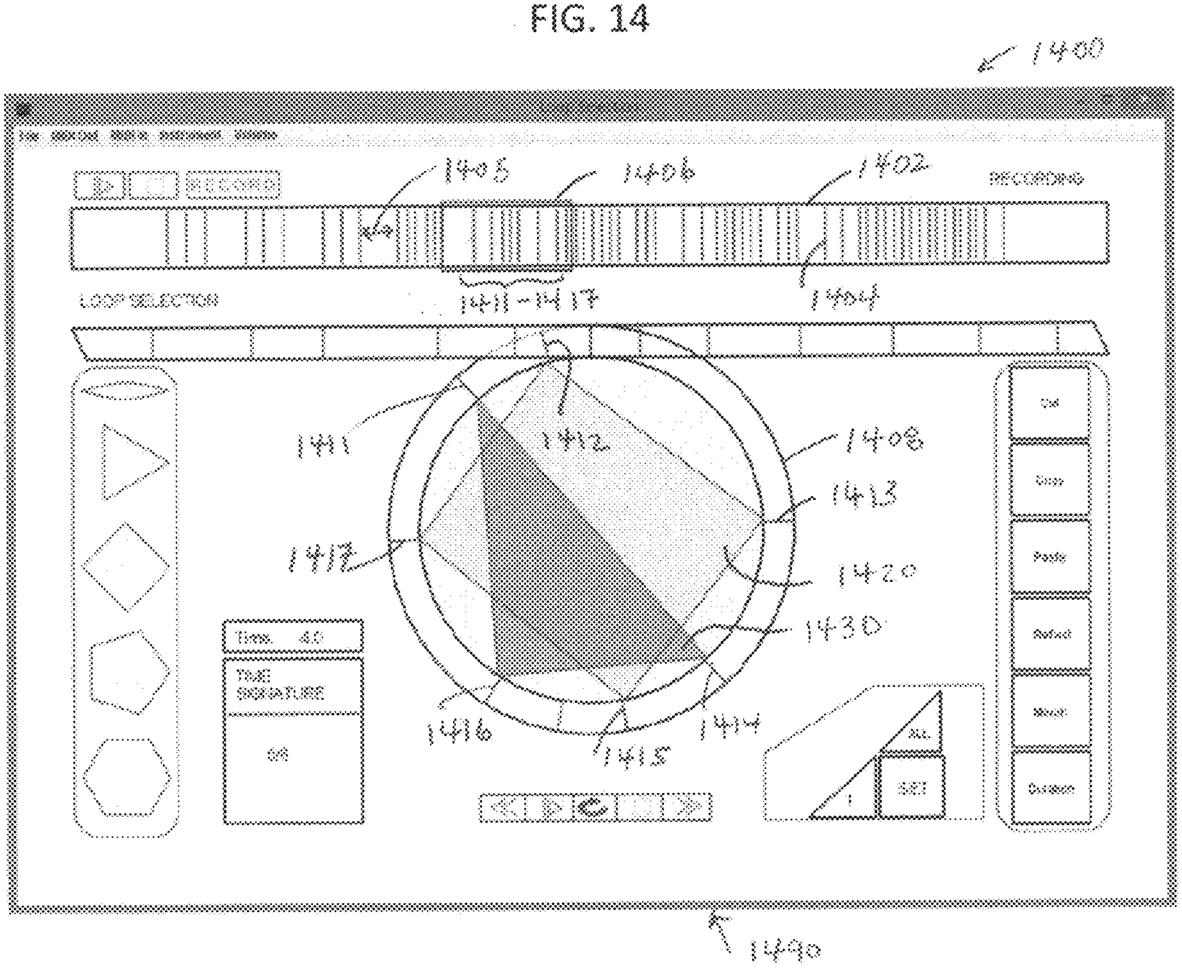
FIG. 14 shows a loop selector of the present invention.

FIG. 14 shows a loop selector 1400 for use with the rhythm system 1300A-H. The loop selector 1400 may be a rhythm system mode providing a display of one or more rhythm system elements 1300A-H. A recording interface with the ability to play over the existing rhythm system may be attached thereto. Such recorded audio, or midi may be mapped or transformed and mapped to a loop for creating shapes with a shape selector which may be saved by name, with copy/cut/paste functions, to a time scale in the rhythm system.

Loop selection methods provide for visualization of a rhythmic structure of a musical composition on a touch screen device display 1490 such as a computer display, tablet computer display, or the like. In one such method, the steps include i) providing a sound recording of a musical work, the musical work having an underlying rhythm identifiable by events in the recording, ii) transforming the sound recording into an event recording 1402 that chronologically marks the initiation of each event 1404 such that the time span between successive events 1405 may be compared, iii) selecting a portion of the recording 1406 including a sequence of events 1411-1417, iv) displaying a shape circle 1408, v) mapping the events in the sequence of events 1411-1417 to corresponding locations around the perimeter of a shape circle such that the mapped events take the same order around the shape circle perimeter as in the sequence, locations of adjacent mapped events are indicative of the time span between the corresponding events in the sequence of events, and the sum of the time spans between mapped events is indicative of the time span of the selected recording portion, and vi) visualizing the rhythmic structure of the musical composition by fitting one or more polygons 1420, 1430 to the mapped events such that polygon vertices coincide with mapped events.

The above method may further comprise wherein first and second polygons 1420, 1430 are fitted to first and second sets of mapped events and the touch screen 1490 is used to rotate the first polygon 1420 relative to the second polygon 1430 to vary the timing between mapped events.

The above method may further comprise wherein timing changes made with the touch screen 1490 result in corresponding timing changes in the event recording 1402.

FIGS. 15A-D show a graph methods of storing and reassembling musical works and/or portions of musical works 1500A-D.

Figure 15A:
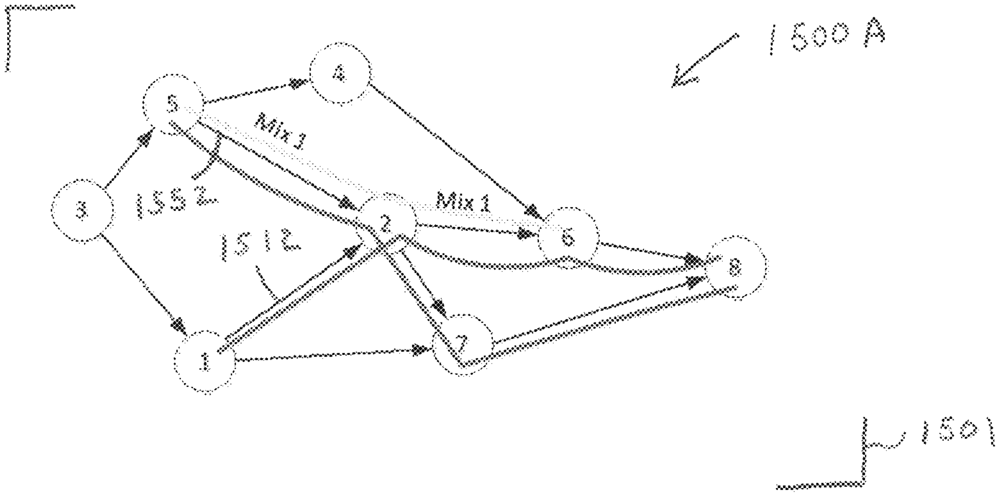
FIG. 15A-D show a graph of the present invention.
Figure 15B:
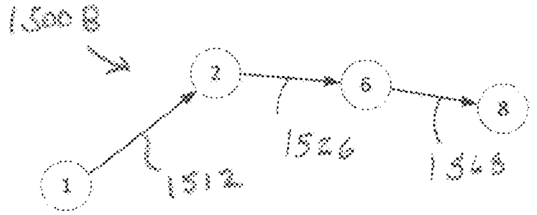
Figure 15C:
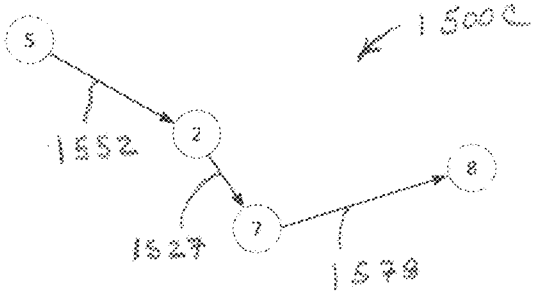

In particular, a method of mixing multiple musical works into continuous playable streams comprises the steps of: i) providing digital data storage accessible to a network shared by a plurality of users, see e.g., musical works stored in nodes 1-8 of network 1501 of FIG. 15A; ii) in the data storage, constructing a directed graph having a set of nodes and a set of edges, see e.g., directed graph 1500A; iii) wherein each node contains a musical work and no two nodes contain the same musical work, iv) wherein each user has access to a user specific group of plural nodes, each pair of nodes e.g. being interconnected by an edge, see e.g. nodes 1500B of FIG. 15B accessible to user 1, nodes 1500C of FIG. 15C accessible to user 2, and exemplary edges 1512-1526-1568 (interconnecting nodes 1-2-6-8), 1552-1527-1578 (interconnecting nodes 5-2-7-8) interconnecting nodes of the first and second users v) wherein each edge identifies instructions used to mix the musical works contained by the two nodes the edge interconnects, and vi) wherein musical works are mixed irrespective of user access rights to create a mixed different from the musical work found in any one node.

Figure 15D:
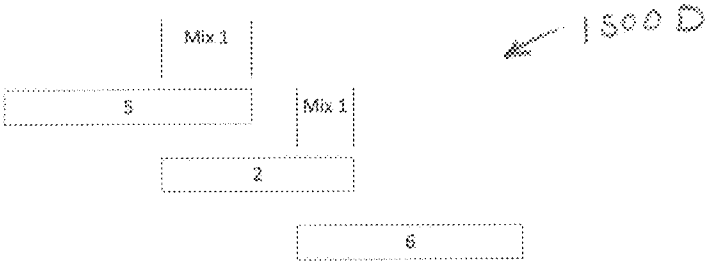

As seen in FIG. 15D, an exemplary mixed work includes content of nodes 5-2-6. Here, Mix 1 includes i) a leading portion of node 5, ii) a mix of a trailing portion of node 5 and a leading portion of node 2, iii) a central portion of node 2, iv) a mix of a trailing portion of node 2 and a leading portion of node 6, and v) a trailing portion of node 6. As mentioned above edges provide, among other things, an indication of overlapping node portions and which node portion(s) will be included and/or played in the overlap.

While various embodiments of the present invention have been described above, it should be understood that they have been presented by way of example only, and not limitation. It will be apparent to those skilled in the art that various changes in the form and details can be made without departing from the spirit and scope of the invention. As such, the breadth and scope of the present invention should not be limited by the above-described exemplary embodiments, but should be defined only in accordance with the following claims and equivalents thereof.

What is claimed is:

1. A music composition, editing, and playback system comprising:

a processor associated with one or more input/output devices including a display for visualizing loti, musical notes, chords, and starbursts;

the processor for executing a computer readable code for music composition, editing, and playback; and, a visual construct in the display resulting at least in part from a user input;

wherein the construct includes a lotus with notes of an octave arranged therearound, a triad chord triangle encircled by the lotus with vertices of the triangle at selected notes of the chord, and starbursts located at the vertices.

2. The music composition, editing, and playback system of claim 1 further comprising:

the lotus having a root note; and, lotus intervals indicated by plumes that lie along lines between the root note and respective notes to which they lead.

3. The music composition, editing, and playback system of claim 2 further comprising:

a centrally located interval defined by a plume between the root note and a note opposite the root note.

4. The music composition, editing, and playback system of claim 3 further comprising:

five intervals located to the left of the central interval; and, five intervals located to the right of the central interval.

5. The music composition, editing, and playback system of claim 4 wherein the plumes originate at the root note but avoid contact with the notes to which they lead.

6. A music composition, editing, and playback system comprising:

a processor associated with one or more input/output devices including a display for visualizing loti, musical notes, chords, and starbursts;

the processor for executing a computer readable code for music composition, editing, and playback;

a visual construct in the display resulting at least in part from a user input;

the construct includes a starburst harmony spiral formed from plural interconnected loti, each loti having an octave of notes arranged therearound;

one of the loti having a root note from which respective starbursts are directed to each the loti; and, plumes of each starburst extending from the root note to notes of the loti to which it is directed.

* * * * *